US012068958B1

(12) United States Patent
Henkel et al.

(10) Patent No.: US 12,068,958 B1
(45) Date of Patent: Aug. 20, 2024

(54) NETWORK SERVICE DISCOVERY

(71) Applicant: Juniper Networks, Inc., Sunnyvale, CA (US)

(72) Inventors: Michael Henkel, Saratoga, CA (US); Mahesh Sivakumar, Milpitas, CA (US); Richard Roberts, Rennes (FR)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 18/193,583

(22) Filed: Mar. 30, 2023

(51) Int. Cl.
*H04L 45/76* (2022.01)
*H04L 45/02* (2022.01)
*H04L 47/125* (2022.01)

(52) U.S. Cl.
CPC .............. *H04L 45/76* (2022.05); *H04L 45/04* (2013.01); *H04L 47/125* (2013.01)

(58) Field of Classification Search
CPC ....... H04L 45/76; H04L 45/04; H04L 45/123; H04L 45/24; H04L 45/64; H04L 45/745; H04L 47/125; H04L 47/32; H04L 41/145; H04L 61/103; H04L 63/101; H04W 40/248
See application file for complete search history.

(56) References Cited

U.S. PATENT DOCUMENTS

| 7,260,645 | B2 | 8/2007 | Bays |
| 9,571,394 | B1 | 2/2017 | Sivaramakrishnan et al. |
| 10,567,288 | B1 | 2/2020 | Mutnuru |
| 2012/0113809 | A1 | 5/2012 | Cortes Gomez |
| 2013/0041972 | A1 | 2/2013 | Field et al. |
| 2022/0006726 | A1* | 1/2022 | Michael ................ H04L 45/24 |
| 2022/0210158 | A1* | 6/2022 | Brar ...................... H04L 63/101 |
| 2022/0247677 | A1* | 8/2022 | Baruah .................. H04L 45/76 |
| 2022/0279420 | A1* | 9/2022 | Akkipeddi ............. H04L 45/64 |
| 2022/0286940 | A1* | 9/2022 | Grewal ............. H04W 40/248 |
| 2022/0329479 | A1* | 10/2022 | Ramachandran ....... H04L 47/32 |

(Continued)

FOREIGN PATENT DOCUMENTS

| EP | 3264691 A1 | 1/2018 |
| EP | 3716533 A1 | 9/2020 |
| WO | 2013/184846 A1 | 12/2013 |

OTHER PUBLICATIONS

"Services, Load Balancing, and Networking", Kubernetes, Nov. 4, 2022, 77 pp.

(Continued)

*Primary Examiner* — Le H Luu
(74) *Attorney, Agent, or Firm* — Shumaker & Sieffert, P.A.

(57) ABSTRACT

Techniques are disclosed for a computing system comprising processing circuitry having access to a storage device, the processing circuitry configured to: generate, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and broadcast, by the network controller and to a second network cluster executing within the container orchestration platform of the SDN, the advertisement in accordance with the routing protocol.

20 Claims, 7 Drawing Sheets

(56) References Cited

U.S. PATENT DOCUMENTS

| | | | |
|---|---|---|---|
| 2023/0062080 A1* | 3/2023 | Sidebottom | H04L 45/123 |
| 2023/0079209 A1* | 3/2023 | Nallamothu | H04L 45/745 709/238 |
| 2023/0097386 A1* | 3/2023 | Kreger-Stickles | H04L 61/103 |
| 2023/0198857 A1* | 6/2023 | Aftab | H04L 41/145 709/226 |
| 2023/0216774 A1* | 7/2023 | Suryanarayana | H04L 45/76 370/254 |

OTHER PUBLICATIONS

Bates et al., "Multiprotocol Extensions for BGP-4", Juniper Networks, Inc., Jan. 2007, 12 pp.

Kn et al., "Day One: Contrail DPDK vROUTER", Juniper Networks, Inc., Jan. 9, 2021, 196 pp.

Rekhter et al., "Carrying Label Information in BGP-4", Cisco Systems, Inc., May 2001, 8 pp.

Walton et al., "Fully Qualified Domain Name Capability for BGP", Cumulus Networks, May 15, 2015, 3pp.

Abraitis, "Service discovery by BGP community", retrieved from the internet: <https://blog.donatas.net/blog/2017/03/02/exa-template/>, Mar. 2, 2017, 5 pp.

Cotton et al., "Internet Assigned Nos. Authority (IANA) Procedures for the Management of the Service Name and Transport Protocol Port Number Registry", Internet Engineering Task Force (IETF), Aug. 2011, 30 pp.

Extended Search Report from counterpart European Application No. 23174535.7 dated Nov. 9, 2023, 9 pp.

Rekhter et al., "A Border Gateway Protocol 4 (BGP-4)", Network Working Group, RFC 4271, Jan. 2006, 93 pp.

Sangli et al., "BGP Extended Communities Attribute," RFC 4360, Feb. 2006, 12 pp.

U.S. Appl. No. 18/399,888, filed Dec. 29, 2023, naming inventors Henkel et al.

* cited by examiner

NETWORK SERVICE DISCOVERY

TECHNICAL FIELD

The disclosure relates to computer networks.

BACKGROUND

In a typical cloud data center environment, a large collection of interconnected servers often provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

A cloud computing infrastructure that manages deployment and infrastructure for application execution may involve two main roles: (1) orchestration—for automating deployment, scaling, and operations of applications across clusters of hosts and providing computing infrastructure, which may include virtual machines (VMs) or container-centric computing infrastructure; and (2) network management—for creating virtual networks in the network infrastructure to enable communication among applications running on virtual execution environments, such as pods or VMs, as well as among applications running on legacy (e.g., physical) environments. Software-defined networking contributes to network management.

Multi-cloud environment refers to the use of multiple clouds for computing and storage services. An enterprise may utilize an on-premise computing and/or storage service (e.g., on-premises cloud), and one or more off-premise clouds such as those hosted by third-party providers. Examples of the clouds include private, public, or hybrid public/private clouds that allow for ease of scalability while allowing different levels of control and security. An enterprise may utilize one or more of private, public, or hybrid public/private clouds based on the types of applications that are executed and other needs of the enterprise.

SUMMARY

Techniques are disclosed for advertising network service information between multiple clusters of a software defined network (SDN). A network cluster (also referred to herein as "cluster") may execute a network service (also referred to herein as "service") and advertise information of the network service to remote network clusters. By advertising network service information to remote network clusters, endpoints within the remote network clusters may communicate with the network service without relying on the network service's IP address using a Domain Name System (DNS) or maintaining a complex service mesh network to interconnect the network clusters for purposes of service deliver and consumption.

Typically, endpoints of remote clusters may communicate with a network service of a network cluster by using a DNS server. However, the DNS server may have a long time to live (TTL) for endpoint references, which may delay operation of the SDN as endpoints are created or destroyed. Administrators of the SDN also do not have control over the DNS server and provides less autonomy when customizing the SDN. Alternative methods may include creating and managing a service mesh according to a proprietary protocol. However service meshes can be complex and difficult to scale with large SDNs. The techniques described herein provide robust and lightweight techniques for communication between endpoints of a network service that are located in remote network clusters.

The techniques may provide one or more technical advantages that realize a practical application. For example, the techniques may provide network administrators the ability to automatically configure virtual execution elements as endpoints of a network service, regardless of which cluster contains the virtual execution elements and the network service. Additionally, the techniques may efficiently and reliably process data by utilizing a reliable protocol to allow control planes of a plurality of network clusters to directly communicate at the IP level, rather than control planes of the plurality of clusters communicating via upstream routers with numerous amounts of next hops. The techniques described herein utilize well-established protocols to efficiently add virtual execution elements residing in a plurality of clusters as endpoints of a network service, without requiring external hardware, like a DNS server, or the development of a complex service mesh.

Network administrators may use a DNS server to manage IP addresses assigned to virtual execution elements added as endpoints of a network service. However, DNS servers reduce network administrators' control over the dynamic nature of software defined networking, such as the constant creation and deletion of virtual execution elements. DNS servers have a time to live parameter for entries of virtual execution elements, which network administrators cannot customize. Network administrators may alternatively consider developing a service mesh network to coordinate the addition and removal of virtual execution elements as endpoints to a network service through a series of next hops between a network of routers. However, developing a service mesh network is complex and inefficient, as well as difficult to manage. In comparison to using a DNS server or a service mesh network, the techniques described herein use a well-established routing protocol that executes efficiently. The techniques reduce computational overhead (e.g., processing cycles consumed, memory, memory bus bandwidth, or other computational resources associated with power consumption) to allow for reliable and efficient service advertisement, while improving the operation of the underlying endpoints running a network application.

In one example, a computing device comprising processing circuitry having access to a storage device, the processing circuitry configured to: generate an advertisement in a first network cluster executing within a container orchestration platform of a software defined network (SDN), wherein the advertisement conforms to a routing protocol and comprises information identifying a network service executing in the first network cluster, wherein the network service exposes a backend of a network application to the container orchestration platform of the SDN; transmit, to a second network cluster executing within the container orchestration platform of the SDN, the advertisement in accordance with the routing protocol; generate, based on the advertisement, a network service directory in the second network cluster; add one or more virtual execution elements executing on the second network cluster as endpoints of the network service, wherein the endpoints run the network application; and implement a network policy to forward, by one or more virtual routers executing in the SDN, network traffic between endpoints of the network service.

In another example, a computing system comprising processing circuitry having access to a storage device, the processing circuitry configured to: generate, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and broadcast, by the network controller and to a second network cluster executing within the container orchestration platform of the SDN, the advertisement in accordance with the routing protocol.

In yet another example, a method comprises: generating, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and broadcasting, by the network controller and to a second network cluster executing within the container orchestration platform of the SDN, the advertisement in accordance with the routing protocol.

In yet another example, a computer-readable storage medium comprising instructions that, when executed, are configured to cause processing circuitry of a network system to: generate, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and broadcast, by the network controller and to a second network cluster executing within the container orchestration platform of the SDN, the advertisement in accordance with the routing protocol.

In yet another example, a computing system comprising processing circuitry having access to a storage device, the processing circuitry configured to: generate, by a network controller executing in a software defined network (SDN), a network service directory in a first network cluster based on an advertisement, wherein the advertisement conforms to a routing protocol and comprises information identifying a network service executing in a second network cluster, wherein the network service exposes a backend of a network application to the container orchestration platform of the SDN; add, by the network controller, one or more virtual execution elements executing on the first network cluster as endpoints of the network service, wherein the endpoints run the network application; and implement a network policy to forward, by one or more virtual routers executing in the SDN, network traffic between endpoints of the network service.

In yet another example, a method comprises: receiving, by a network controller executing in a software defined network (SDN), an advertisement, wherein the advertisement conforms to a routing protocol and comprises information identifying a network service executing in a second network cluster, wherein the network service exposes a backend of a network application to the container orchestration platform of the SDN; generating, by the network controller, a network service directory in a first network cluster based on the advertisement; and adding, by the network controller, one or more virtual execution elements executing on the first network cluster as endpoints of the network service, wherein the endpoints run the network application.

In yet another example, a computer-readable storage medium comprising instructions that, when executed, are configured to cause processing circuitry of a network system to: generate, by a network controller executing in a software defined network (SDN), a network service directory in a first network cluster based on an advertisement, wherein the advertisement conforms to a routing protocol and comprises information identifying a network service executing in a second network cluster, wherein the network service exposes a backend of a network application to the container orchestration platform of the SDN; and add, by the network controller, one or more virtual execution elements executing on the first network cluster as endpoints of the network service, wherein the endpoints run the network application.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

In general, the techniques set forth herein enable efficient and dynamic communication between virtual execution elements among a plurality of network clusters (also referred to herein as "clusters"). In some instances, a network service (also referred to herein as "service") (e.g., a method to expose a network application that is running as one or more of virtual execution elements) of one network cluster (e.g., AWS webservices, MongoDB, etc.) may communicate with virtual execution elements (e.g., pods or VMs) of a remote cluster to easily manage the utilization of resources used by a cluster to maximize efficiency and reduce execution costs. Typically, a DNS server was used, but required extra orchestration and did not allow user control of the time to live configurations.

The techniques described herein integrates network service information in advertisements broadcasted between a plurality of clusters. These advertisements may conform to a network routing protocol (such as a border gateway routing protocol) that is normally used for advertising routes in a network or between networks (along with other routing specific information). Considering that network routing protocols have been used in networks and undergone extensive testing and troubleshooting to provide consistent operation in a wide variety of different network topologies, while also having a well-defined suite of software and/or hardware implementations, the network routing protocol may provide for lightweight and efficient (e.g., in terms of computing utilization) advertising of service information between network clusters.

Figure 1:
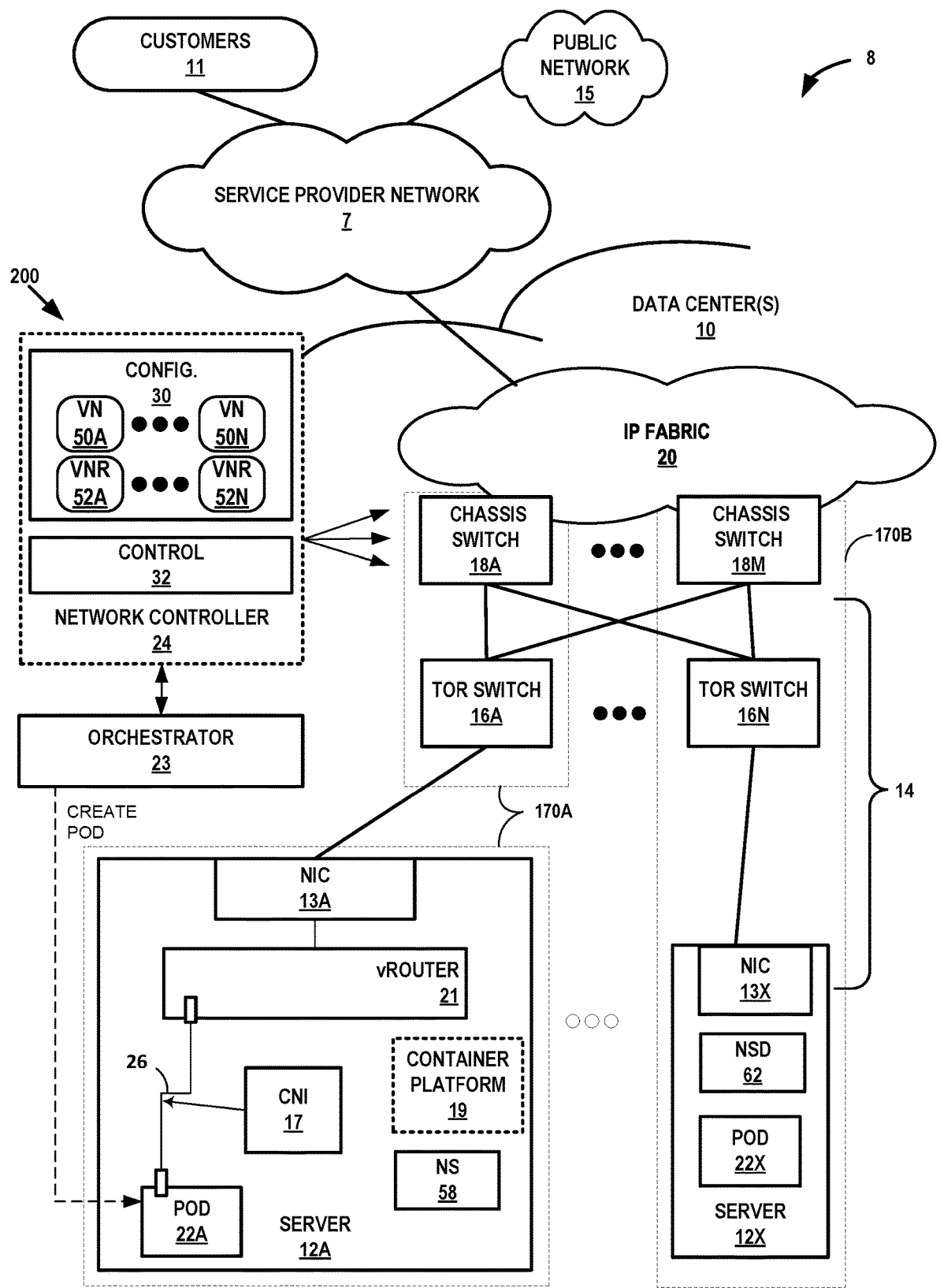
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. Current implementations of software-defined networking (SDN) architectures for virtual networks present challenges for cloud-native adoption due to, e.g., complexity in life cycle management, a mandatory high resource analytics component, scale limitations in configuration modules, and no command-line interface (CLI)-based (kubectl-like) interface. Computing infrastructure 8 includes a cloud-native SDN architecture system, described herein, that addresses these challenges and modernizes for the telco cloud-native era. Example use cases for the cloud-native SDN architecture include 5G mobile networks as well as cloud and enterprise cloud-native use cases. An SDN architecture may include data plane elements implemented in compute nodes (e.g., servers 12) and network devices such as routers or switches, and the SDN architecture may also include an SDN controller (e.g., network controller 24) for creating and managing virtual networks. The SDN architecture configuration and control planes are designed as scale-out cloud-native software with a container-based microservices architecture that supports in-service upgrades.

As a result, the SDN architecture components are microservices and, in contrast to existing network controllers, the SDN architecture assumes a base container orchestration platform to manage the lifecycle of SDN architecture components. A container orchestration platform is used to bring up SDN architecture components; the SDN architecture uses cloud native monitoring tools that can integrate with customer provided cloud native options; the SDN architecture provides declarative way of resources using aggregation APIs for SDN architecture objects (i.e., custom resources). The SDN architecture upgrade may follow cloud native patterns, and the SDN architecture may leverage Kubernetes constructs such as Multus, Authentication & Authorization, Cluster API, KubeFederation, KubeVirt, and Kata containers. The SDN architecture may support data plane development kit (DPDK) pods, and the SDN architecture can extend to support Kubernetes with virtual network policies and global security policies.

For service providers and enterprises, the SDN architecture automates network resource provisioning and orchestration to dynamically create highly scalable virtual networks and to chain virtualized network functions (VNFs) and physical network functions (PNFs) to form differentiated service chains on demand. The SDN architecture may be integrated with orchestration platforms (e.g., orchestrator 23) such as Kubernetes, OpenShift, Mesos, OpenStack, VMware vSphere, and with service provider operations support systems/business support systems (OSS/BSS).

In general, one or more data center(s) 10 provide an operating environment for applications and services for customer sites 11 (illustrated as "customers 11") having one or more customer networks coupled to the data center by service provider network 7. Each of data center(s) 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within any of data center(s) 10. For example, data center(s) 10 may host multiple tenants (customers) each associated with one or more virtual private networks (VPNs), each of which may implement one of customer sites 11.

Service provider network 7 offers packet-based connectivity to attached customer sites 11, data center(s) 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, each of data center(s) 10 may represent one of many geographically distributed network data centers, which may be connected to one another via service provider network 7, dedicated network links, dark fiber, or other connections. As illustrated in the example of FIG. 1, data center(s) 10 may include facilities that provide network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center(s) 10 such as one or more physical network functions (PNFs) or virtualized network functions (VNFs) may be included within the service provider network 7 core.

In this example, data center(s) 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-

16N. Servers 12 are computing devices and may also be referred to herein as "compute nodes," "hosts," or "host devices." Although only server 12A coupled to TOR switch 16A is shown in detail in FIG. 1, data center 10 may include many additional servers coupled to other TOR switches 16 of data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center(s) 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center(s) 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements, such as pods or virtual machines, by virtualizing resources of the server to provide some measure of isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., an of data center(s) 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21 (illustrated as and also referred to herein as "vRouter 21"), virtual routers running in servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines ("VMs"). A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Virtual execution elements may represent application workloads. As shown in FIG. 1, server 12A hosts one virtual network endpoint in the form of pod 22 having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O may be a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21.

As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by virtual router 21 of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of network interface card 13A of the server but also a virtual network identifier such as a VxLAN tag or Multi-protocol Label Switching (MPLS) label that identifies one of the virtual networks as well as the corresponding routing instance executed by virtual router 21. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22), virtual router 21 attaches a tunnel encapsulation header indicating the virtual network for the packet to generate an encapsulated or "tunnel" packet, and virtual router 21 outputs the encapsulated packet via overlay tunnels for the virtual networks to a physical destination computing device, such as another one of servers 12. As used herein, virtual router 21 may execute the operations of a tunnel endpoint to encapsulate inner packets sourced by virtual network endpoints to generate tunnel packets and decapsulate tunnel packets to obtain inner packets for routing to other virtual network endpoints.

In some examples, virtual router 21 may be kernel-based and execute as part of the kernel of an operating system of server 12A.

In some examples, virtual router 21 may be a Data Plane Development Kit (DPDK)-enabled virtual router. In such examples, virtual router 21 uses DPDK as a data plane. In this mode, virtual router 21 runs as a user space application that is linked to the DPDK library (not shown). This is a performance version of a virtual router and is commonly used by telecommunications companies, where the VNFs are often DPDK-based applications. The performance of virtual router 21 as a DPDK virtual router can achieve ten times higher throughput than a virtual router operating as a kernel-based virtual router. The physical interface is used by DPDK's poll mode drivers (PMDs) instead of Linux kernel's interrupt-based drivers.

A user-I/O (UIO) kernel module, such as vfio or uio_pci_generic, may be used to expose a physical network interface's registers into user space so that they are accessible by the DPDK PMD. When NIC 13A is bound to a UIO driver, it is moved from Linux kernel space to user space and therefore no longer managed nor visible by the Linux OS. Consequently, it is the DPDK application (i.e., virtual router 21A in this example) that fully manages NIC 13. This includes packets polling, packets processing, and packets forwarding. User packet processing steps may be performed by virtual router 21 DPDK data plane with limited or no participation by the kernel (where the kernel not shown in FIG. 1). The nature of this "polling mode" makes the virtual router 21 DPDK data plane packet processing/forwarding much more efficient as compared to the interrupt mode, particularly when the packet rate is high. There are limited or no interrupts and context switching during packet I/O. Additional details of an example of a DPDK vRouter are found in "DAY ONE: CONTRAIL DPDK vROUTER," 2021, Kiran K N et al., Juniper Networks, Inc., which is incorporated by reference herein in its entirety.

Computing infrastructure 8 implements an automation platform for automating deployment, scaling, and operations of virtual execution elements across servers 12 to provide virtualized infrastructure for executing application workloads and services. In some examples, the platform may be a container orchestration system that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration may facilitate container coordination and refers to the deployment, management, scaling, and configuration, e.g., of containers to host servers by a container orchestration platform. Example instances of orchestration platforms include Kubernetes (a container orchestration system), Docker swarm, Mesos/Marathon, OpenShift, OpenStack, VMware, and Amazon ECS.

Elements of the automation platform of computing infrastructure 8 include at least servers 12, orchestrator 23, and network controller 24. Containers may be deployed to a virtualization environment using a cluster-based framework in which a cluster master node of a network cluster manages the deployment and operation of containers to one or more cluster minion nodes of the network cluster. The terms "master node" and "minion node" used herein encompass different orchestration platform terms for analogous devices that distinguish between primarily management elements of a network cluster and primarily container hosting devices of a network cluster. For example, the Kubernetes platform uses the terms "cluster master" and "minion nodes," while the Docker Swarm platform refers to cluster managers and cluster nodes.

Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding example operations of a network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "TUNNELED PACKET AGGREGATION FOR VIRTUAL NETWORKS," each which is incorporated by reference as if fully set forth herein.

In general, orchestrator 23 controls the deployment, scaling, and operations of containers across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform. Example components of a Kubernetes orchestration system are described below with respect to FIG. 3.

In one example, pod 22 is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22 is an example of a virtual execution element. Containers of a pod are always co-located on a single server, co-scheduled, and run in a shared context. The shared context of a pod may be a set of Linux namespaces, cgroups, and other facets of isolation.

Within the context of a pod, individual applications might have further sub-isolations applied. Typically, containers within a pod have a common IP address and port space and are able to detect one another via the localhost. Because they have a shared context, containers within a pod may also communicate with one another using inter-process communications (IPC). Examples of IPC include System V semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19 for running containerized applications, such as those of pod 22. Container platform 19 receives requests from orchestrator 23 to obtain and host, in server 12A, containers. Container platform 19 obtains and executes the containers.

Container network interface (CNI) 17 configures virtual network interfaces for virtual network endpoints. The orchestrator 23 and container platform 19 use CNI 17 to manage networking for pods, including pod 22. For example, CNI 17 creates virtual network interfaces to connect pods to virtual router 21 and enables containers of such pods to communicate, via the virtual network interfaces, to other virtual network endpoints over the virtual networks. CNI 17 may, for example, insert a virtual network interface for a virtual network into the network namespace for containers in pod 22 and configure (or request to configure) the virtual network interface for the virtual network in virtual router 21 such that virtual router 21 is configured to send packets received from the virtual network via the virtual network interface to containers of pod 22 and to send packets received via the virtual network interface from containers of pod 22 on the virtual network. CNI 17 may assign a network address (e.g., a virtual IP address for the virtual network) and may set up routes for the virtual network interface.

In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

CNI 17 may represent a library, a plugin, a module, a runtime, or other executable code for server 12A. CNI 17 may conform, at least in part, to the Container Network Interface (CNI) specification or the rkt Networking Proposal. CNI 17 may represent a Contrail, OpenContrail, Multus, Calico, cRPD, or other CNI. CNI 17 may alternatively be referred to as a network plugin or CNI plugin or CNI instance. Separate CNIs may be invoked by, e.g., a Multus CNI to establish different virtual network interfaces for pod 22.

CNI 17 may be invoked by orchestrator 23. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks. The CNI specification specifies a number of considerations for a conforming plugin ("CNI plugin").

Pod 22 includes one or more containers. In some examples, pod 22 includes a containerized DPDK workload that is designed to use DPDK to accelerate packet processing, e.g., by exchanging data with other components using DPDK libraries. Virtual router 21 may execute as a containerized DPDK workload in some examples.

Pod 22 is configured with virtual network interface 26 for sending and receiving packets with virtual router 21. Virtual network interface 26 may be a default interface for pod 22. Pod 22 may implement virtual network interface 26 as an Ethernet interface (e.g., named "eth0") while virtual router 21 may implement virtual network interface 26 as a tap interface, virtio-user interface, or other type of interface.

Pod 22 and virtual router 21 exchange data packets using virtual network interface 26. Virtual network interface 26 may be a DPDK interface. Pod 22 and virtual router 21 may set up virtual network interface 26 using vhost. Pod 22 may operate according to an aggregation model. Pod 22 may use a virtual device, such as a virtio device with a vhost-user adapter, for user space container inter-process communication for virtual network interface 26.

CNI 17 may configure, for pod 22, in conjunction with one or more other components shown in FIG. 1, virtual network interface 26. Any of the containers of pod 22 may utilize, i.e., share, virtual network interface 26 of pod 22.

Virtual network interface 26 may represent a virtual ethernet ("veth") pair, where each end of the pair is a separate device (e.g., a Linux/Unix device), with one end of the pair assigned to pod 22 and one end of the pair assigned to virtual router 21. The veth pair or an end of a veth pair are sometimes referred to as "ports". A virtual network interface may represent a macvlan network with media access control (MAC) addresses assigned to pod 22 and to virtual router 21 for communications between containers of pod 22 and virtual router 21. Virtual network interfaces may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pod 22 is a virtual network endpoint in one or more virtual networks. Orchestrator 23 may store or otherwise manage configuration data for application deployments that specifies a virtual network and specifies that pod 22 (or the one or more containers therein) is a virtual network endpoint of the virtual network. Orchestrator 23 may receive the configuration data from a user, operator/administrator, or other computing system, for instance.

As part of the process of creating pod 22, orchestrator 23 requests that network controller 24 create respective virtual network interfaces for one or more virtual networks (indicated in the configuration data). Pod 22 may have a different virtual network interface for each virtual network to which it belongs. For example, virtual network interface 26 may be a virtual network interface for a particular virtual network. Additional virtual network interfaces (not shown) may be configured for other virtual networks.

Network controller 24 processes the request to generate interface configuration data for virtual network interfaces for the pod 22. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

Network controller 24 sends interface configuration data to server 12A and, more specifically in some cases, to virtual router 21. To configure a virtual network interface for pod 22, orchestrator 23 may invoke CNI 17. CNI 17 obtains the interface configuration data from virtual router 21 and processes it. CNI 17 creates each virtual network interface specified in the interface configuration data. For example, CNI 17 may attach one end of a veth pair implementing management interface 26 to virtual router 21 and may attach the other end of the same veth pair to pod 22, which may implement it using virtio-user.

The following is example interface configuration data for pod 22 for virtual network interface 26.
[{
  //virtual network interface 26
  "id": "fe4bab62-a716-11e8-abd5-0cc47a698428",
  "instance-id": "fe3edca5-a716-11e8-822c-0cc47a698428",
  "ip-address": "10.47.255.250",
  "plen": 12,
  "vn-id": "56dda39c-5e99-4a28-855e-6ce378982888",
  "vm-project-id": "00000000-0000-0000-0000-000000000000",
  "mac-address": "02:fe:4b:ab:62:a7",
  "system-name": "tapeth0fe3edca",
  "rx-vlan-id": 65535,
  "tx-vlan-id": 65535,
  "vhostuser-mode": 0,
  "v6-ip-address": "::",
  "v6-plen":,
  "v6-dns-server":"::",
  "v6-gateway":"::",
  "dns-server": "10.47.255.253",
  "gateway": "10.47.255.254",
  "author": "/usr/bin/contrail-vrouter-agent",
  "time": "426404:56:19.863169"
}]

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

Network controller 24 is a cloud-native, distributed network controller for software-defined networking (SDN) that is implemented using one or more configuration nodes 30 and one or more control nodes 32. Each of configuration nodes 30 may itself be implemented using one or more cloud-native, component microservices. Each of control nodes 32 may itself be implemented using one or more cloud-native, component microservices.

In some examples, configuration nodes 30 may be implemented by extending the native orchestration platform to support custom resources for the orchestration platform for software-defined networking and, more specifically, for providing northbound interfaces to orchestration platforms to support intent-driven/declarative creation and managing of virtual networks by, for instance, configuring virtual network interfaces for virtual execution elements, configuring underlay networks connecting servers 12, configuring overlay routing functionality including overlay tunnels for the virtual networks and overlay trees for multicast layer 2 and layer 3.

Network controller 24, as part of the SDN architecture illustrated in FIG. 1, may be multi-tenant aware and support multi-tenancy for orchestration platforms. For example, network controller 24 may support Kubernetes Role Based Access Control (RBAC) constructs, local identity access management (IAM) and external IAM integrations. Network controller 24 may also support Kubernetes-defined networking constructs and advanced networking features like virtual networking, BGPaaS, networking policies, service chaining and other telco features. Network controller 24 may support network isolation using virtual network constructs and support layer 3 networking.

To interconnect multiple virtual networks, network controller 24 may use (and configure in the underlay and/or virtual routers 21) import and export policies that are defined using a Virtual Network Router (VNR) resource. The Virtual Network Router resource may be used to define connectivity among virtual networks by configuring import and export of routing information among respective routing instances used to implement the virtual networks in the SDN architecture. A single network controller 24 may support multiple Kubernetes clusters, and VNR thus allows connecting multiple virtual networks in a namespace, virtual networks in different namespaces, Kubernetes clusters, and across Kubernetes clusters. VNR may also extend to support virtual network connectivity across multiple instances of network controller 24. VNR may alternatively be referred to herein as Virtual Network Policy (VNP) or Virtual Network Topology.

As shown in the example of FIG. 1, network controller 24 may maintain configuration data (e.g., config. 30) representative of virtual networks (VN) 50A-50N ("VNs 50") that represent policies and other configuration data for establishing VNs 50 within data centers 10 over the physical underlay network and/or virtual routers, such as virtual router 21 ("vRouter 21"). Network controller 24 may also maintain configuration data (e.g., config. 30) representative of virtual network routers (VNRs) 52A-52N ("VNRs 52") that may be implemented, at least in part, using policies and other configuration data for establishing interconnectivity between VNs 50.

A user, such as an administrator, may interact with UI 60 of network controller 24 to define VNs 50 and VNRs 52. In some instances, UI 60 represents a graphical user interface (GUI) that facilitate entry of the configuration data that defines VNs 50 and VNR 52. In other instances, UI 60 may represent a command line interface (CLI) or other type of interface. Assuming that UI 60 represents a graphical user interface, the administrator may define VNs 50 by arranging graphical elements representative of different pods, such as pod 22, to associate pods with VNs 50, where any of VNs 50 enables communications among one or more pods assigned to that VN.

In this respect, an administrator may understand Kubernetes or other orchestration platforms but not fully understand the underlying infrastructure that supports VNs 50. Some controller architectures, such as Contrail, may configure VNs 50 based on networking protocols that are similar, if not substantially similar, to routing protocols in traditional physical networks. For example, Contrail may utilize concepts from a border gateway protocol (BGP), which is a routing protocol used for communicating routing information within so-called autonomous systems (ASes) and sometimes between ASes.

There are different versions of BGP, such as internal BGP (iBGP) for communicating routing information within ASes, and external BGP (eBGP) for communicating routing information between ASes. Each version of BGP may also include a multi-protocol BGP (MP-BGP), such as MP-eBGP or MP-iBGP. ASes may be related to the concept of projects within Contrail, which is also similar to namespaces in Kubernetes. In each instance of AS, projects, and namespaces, an AS, like projects, and namespaces may represent a collection of one or more networks (e.g., one or more of VNs 50) that may share routing information and thereby facilitate interconnectivity between networks (or, in this instances, VNs 50).

In the simplest form, VNRs 52 represent a logical abstraction of a router set in the context of Kubernetes, where VNRs 52 may be defined as a custom resource to facilitate interconnectivity between VNs 50. Given that Kubernetes administrators may not fully understand intricate dissemination of routing information according to complicated routing protocols, such as BGP, various aspects of the cloud-native networking techniques may facilitate abstraction of the underlying routing protocols (or the complimentary processes of Contrail or other controller architectures) as VNRs 52.

That is, rather than resort to defining how routing is to occur between two or more VNs 50, the administrator may define one or more VNRs 52 to interconnect VNs 50 without having to manually develop and deploy extensive policies and/or routing instance configurations to enable the exchange of routing information between such VNs 50. Instead, the administrator (which may have little understanding of routing protocols) may define a custom resource (e.g., one or more of VNRs 52) using familiar Kubernetes syntax/semantics (or even just by dragging graphical elements and specifying interconnections between this graphical element representative of, as an example, VNR 52A, and graphical elements representative of, again as an example, VNs 50A and 50N).

In this respect, administrators may easily interconnect VNs 50 using the logical abstraction shown in the example of FIG. 1 as VNRs 50, whereupon network controller 24 may translate VNRs 50 into underlying route targets to automatically (meaning with little or possibly without any human intervention) cause routing information for VNs 50A and 50N to be exchanged and enable communication (meaning, exchange of packets or other data) between VNs 50A and 50N.

Given that administrator may employ familiar Kubernetes syntax/semantics to configure VNRs 50 rather the configure complicated configuration data that conforms to routing protocol syntax/semantics, network controller 24 may facilitate a better user experience while also promoting more efficient operation of data center 8 itself. That is, having administrators enter configuration data for which such administrators are unfamiliar may result in misconfiguration that wastes underlying resources of data center 8 (in terms of processing cycles, memory, bus bandwidth, etc. along with associated power) while also delaying proper implementation of the network topologies (which may prevent successful routing of packets and other data between VNs 50). This delay may not only frustrate administrators but also customers associated with VNs 50 that may require prompt operation of VNs 50 to achieve business goals. By enabling administrators to easily facilitate communication between VNs 50 using the logical abstractions shown as VNRs 50, data center 8 may itself experience more efficient operation (in terms of the above computing resources including processor cycles, memory, bus bandwidth and associated power) while providing a better user experience for both administrators and customers.

In operation, network controller 24, an SDN architecture system representative of data center 10, includes processing circuitry to implement a configuration node and a control node. Network controller 24 may be configured to interconnect a first virtual network (e.g., VN 50A) and a second virtual network (e.g., VN 50N) operating within the SDN architecture system represented by data center 10. Network controller 24 may be configured to define a logical abstraction of one or more policies to perform such interconnection via one or more of VNRs 52, e.g., VNR 52A.

The policies may include import and export policies with respect to routing information maintained by the virtual networks (which, in this example, may refer to VNs 50A and 50N). That is, Kubernetes may be expanded, via a custom resource representative of VNR 52A, to translate VNR 52A into one or more import and export policies that are deployed with respect to VN 50A and VN 50N so as configure intercommunication via routing information distribution between VN 50A and VN 50N. Once configured, VN 50A may export routing information (e.g., representative of routes for VN 50A) to VN 50N and import routing information (e.g., representative of routes for VN 50N) to VN 50A. Likewise, VN 50N may export routing information (e.g., representative of routes for VN 50N) to VN 50A and import routing information (e.g., representative of routes for VN 50A) to VN 50N.

The abstraction may hide underlying routing configuration to enable such routing leaking, such as route targets that define routing information import and export to routing instances used to implement VN 50A and VN 50N. Instead, network controller 24 may translate VNR 52A to a common route target and configure communication of routing information via the common route target for the routing instances used to implement VN 50A and VN 50N (in this example).

To implement mesh connectivity, network controller 24 may configure the import and the export of the routing instance for VN 50A, VN 50N, and VNR 52A with the route target associated with VN 50A, VN 50N, and VNR 52A. To implement hub-and-spoke connectivity, network controller 24 may configure the export for the routing instances associated with VN 50A and VN 50N to export routing information to the routing instances associated with VNR 52A (acting as the hub) and the routing instances for VNR 52A to import routing information to the routing instances associated with VN 50A and VN 50N. In this hub-and spoke connectivity, VN 50A and VN 50N may not communicate directly with one another.

In addition, network controller 24 may enable multi layers of security using network policies. The Kubernetes default behavior is for pods to communicate with one another. In order to apply network security policies, the SDN architecture implemented by network controller 24 and virtual router 21 may operate as a CNI for Kubernetes through CNI 17. For layer 3, isolation occurs at the network level and virtual networks operate at L3. Virtual networks are connected by policy. The Kubernetes native network policy provides security at layer 4. The SDN architecture may support Kubernetes network policies. Kubernetes network policy operates at the Kubernetes namespace boundary. The SDN architecture may add custom resources for enhanced network policies. The SDN architecture may support application-based security. (These security policies can in some cases be based upon metatags to apply granular security policy in an extensible manner.) For layer 4+, the SDN architecture may in some examples support integration with containerized security devices and/or Istio and may provide encryption support.

Network controller 24, as part of the SDN architecture illustrated in FIG. 1, may support multi-cluster deployments, which is important for telco cloud and high-end enterprise use cases. The SDN architecture may support multiple Kubernetes clusters, for instance. A Cluster API can be used to support life cycle management of Kubernetes clusters. KubefedV2 can be used for configuration nodes 32 federation across Kubernetes clusters. Cluster API and KubefedV2 are optional components for supporting a single instance of a network controller 24 supporting multiple Kubernetes clusters.

The SDN architecture may provide insights at infrastructure, cluster, and application using web user interface and telemetry components. Telemetry nodes may be cloud-native and include microservices to support insights.

As a result of the above features and others that will be described elsewhere herein, computing infrastructure 8 implements an SDN architecture that is cloud-native and may present one or more of the following technical advantages. For example, network controller 24 is a cloud-native, lightweight distributed application with a simplified installation footprint. This also facilitates easier and modular upgrade of the various component microservices for configuration node(s) 30 and control node(s) 32 (as well as any other components of other example of a network controller described in this disclosure). The techniques may further enable optional cloud-native monitoring (telemetry) and user interfaces, a high-performance data plane for containers using a DPDK-based virtual router connecting to DPDK-enabled pods, and cloud-native configuration management that in some cases leverages a configuration framework for existing orchestration platforms, such as Kubernetes or Openstack. As a cloud-native architecture, network controller 24 is a scalable and elastic architecture to address and support multiple clusters. Network controller 24 in some cases may also support scalability and performance requirements for key performance indicators (KPIs).

An SDN architecture having features and technical advantages such as those described herein can be used to implement cloud-native telco clouds to support, for instance, 5G mobile networking (and subsequent generations) and edge computing, as well as enterprise Kubernetes platforms including, for instance, high performance cloud-native application hosting. Telco cloud applications are rapidly moving towards containerized, cloud-native approaches. 5G fixed and mobile networks are driving the requirement to deploy workloads as microservices with significant disaggregation, particularly in the 5G Next-Gen RAN (5GNR). The 5G NextGen Core (5GNC) is likely to be deployed as a set of microservices-based applications corresponding to each of the different components described by the 3GPP. When viewed as groups of microservices delivering applications, it 5GNC is likely to be a highly complex combination of pods with complex networking, security, and policy requirements. The cloud-native SDN architecture described herein, having well-defined constructs for networking, security, and policy, can be leveraged for this use case. Network controller 24 may provide the relevant APIs to be able to create these complex constructs.

Likewise, the user plane function (UPF) within the 5GNC will be an ultra-high-performance application. It may be delivered as a highly distributed set of high-performance pods. The SDN architecture described herein may be able to offer very high throughput data plane (both in terms of bits per section (bps) and packets per second (pps)). Integration with a DPDK virtual router with recent performance enhancements, eBPF, and with SmartNIC will be assist with achieving the throughput required. A DPDK-based virtual router is described in further detail in U.S. application Ser. No. 17/649,632, filed Feb. 1, 2022, entitled "CONTAINERIZED ROUTER WITH VIRTUAL NETWORKING", which is incorporated herein by reference in its entirety.

High performance processing is likely to be also relevant in the GiLAN as workloads there are migrated from more traditional virtualized workloads to containerized microservices. In the data plane of both the UPF and the GiLAN services, such as GiLAN firewall, intrusion detection and prevention, virtualized IP multimedia subsystem (vIMS) voice/video, and so forth, the throughput will be high and sustained both in terms of bps and pps. For the control plane of 5GNC functions, such as Access and Mobility Management Function (AMF), Session Management Function (SMF), etc., as well as for some GiLAN services (e.g., IMS), while the absolute volume of traffic in terms of bps may be modest, the predominance of small packets means that pps will remain high. In some examples, the SDN controller and data plane provide multi-million packets per second per virtual router 21, as implemented on servers 12. In the 5G radio access network (RAN), to move away from the proprietary vertically integrated RAN stacks provided by legacy radio vendors, Open RAN decouples the RAN hardware and software in a number of components including non-RT Radio Intelligent Controller (RIC), near-real-time RIC, centralized unit (CU) control plane and user plane (CU-CP and CU-UP), distributed unit (DU), and radio unit (RU). Software components are deployed on commodity server architectures supplemented with programmable accelerators where necessary. The SDN architecture described herein may support the O-RAN specifications.

Edge compute is likely to be primarily targeted at two different use cases. The first will be as a support for containerized telco infrastructure (e.g. 5G RAN, UPF, Security functions) and the second will be for containerized service workloads, both from the telco as well as from third parties such as vendors or enterprise customers. In both cases, edge compute is effectively a special case of the GiLAN, where traffic is broken out for special handling at highly distributed locations. In many cases, these locations will have limited resources (power, cooling, space).

The SDN architecture described herein may be well-suited to support the requirement of a very lightweight footprint, may support compute and storage resources in sites remote from the associated control functions, and may be location-aware in the way in which workloads and storage are deployed. Some sites may have as few as one or two compute nodes delivering a very specific set of services to a highly localized set of users or other services. There is likely to be a hierarchy of sites where the central sites are densely connected with many paths, regional sites are multiply connected with two to four uplink paths and the remote edge sites may have connections to only one or two upstream sites.

This calls for extreme flexibility in the way in which the SDN architecture may be deployed and the way (and location) in which tunneled traffic in the overlay is terminated and bound into the core transport network (SRv6, MPLS, etc.). Likewise, in sites that host telco cloud infrastructure workloads, the SDN architecture described herein may support specialized hardware (GPU, SmartNIC, etc.) required by high-performance workloads. There may also be workloads that require SR-IOV. As such, the SDN architecture may also support the creation of VTEPs at the ToR and linking that back into the overlay as VXLAN.

It is expected that there will be a mix of fully distributed Kubernetes micro clusters where each site runs its own master(s), and the SDN architecture may support Remote Compute-like scenarios.

For use cases involving an enterprise Kubernetes platform, high-performance cloud-native applications power financial services platforms, online gaming services, and hosted application service providers. The cloud platforms that deliver these applications must provide high performance, resilience against failures, with high security and visibility. The applications hosted on these platforms tend to be developed in-house. The application developers and platform owners work with the infrastructure teams to deploy and operate instances of the organization's applications. These applications tend to require high throughput (>20 Gbps per server), and low latency. Some applications may also use multicast for signaling or payload traffic. Additional hardware, and network infrastructure may be leveraged to ensure availability. Applications and microservices will leverage namespaces within the cluster for partitioning. Isolation between namespaces is critical in high-security environments. While default deny policies are the standard posture in zero-trust application deployment environments, additional network segmentation using virtual routing and forwarding instances (VRFs) adds an additional layer of security and allows for the use of overlapping network ranges. Overlapping network ranges are a key requirement for managed application hosting environments, which tend to standardize on a set of reachable endpoints for all managed customers.

Complex microservice-based applications tend to leverage complex network filters. The SDN architecture described herein may deliver high performance firewall filtering at scale. Such filtering can exhibit consistent forwarding performance, with less latency degradation regardless of rule-set length or sequence. Some customers may also have some of the same regulatory pressures as telcos with respect to the separation of applications, not just at the network layer, but also in the kernel. Financials, but also others have the requirement for data plane encryption, particularly when running on the public cloud. In some examples, the SDN architecture described herein may include features for satisfying these requirements.

In some examples, the SDN architecture may provide GitOps-friendly UX for strict change management controls, auditing and reliability of making changes in production several times per day, even hundreds of times per day when the SDN architecture is automated through an application dev/test/stage/prod continuous integration/continuous development (CI/CD) pipeline.

Administrators of SDNs may want to add virtual execution elements (e.g., pods or VMs) of remote network clusters as endpoints of a network service (e.g., a component that exposes a backend of a network application to the container orchestration platform of the SDN, such that endpoints of the network service run the network application) to maximize efficiency and reduce execution costs. The techniques described herein may allow administrators to maximize efficiency of adding and removing virtual execution elements as endpoints of a network service by avoiding the creation of duplicate services that implementing a DNS server may rely on. The techniques also allow administrators to reduce execution costs with the ability to dynamically add virtual execution elements of any cluster (e.g., add a virtual execution element of a cluster with less expensive processing or memory expenses) as endpoints of a network service and enable forwarding of network traffic between endpoints of the network service through a virtual router, rather than with a DNS server or a series of upstream and downstream routers (e.g., a service mesh network). Administrators may additionally load balance, with a virtual router, network traffic for a network application and the network application's processing requirements between virtual execution elements residing in various clusters added as endpoints of a network service. The techniques enable administrators to establish communication between endpoints of a network service—regardless of which cluster an endpoint is located in—at an Internet Protocol (IP) level by directly assigning IP addresses to virtual execution elements assigned as endpoints according to a reliable protocol, without relying on a DNS server or developing a complex service mesh.

In some examples, orchestrator 23 may use network controller 24 to create duplicates of a network service (e.g., network service 58) in a plurality of network clusters (e.g., network clusters 170A and 170B). Network controller 24 may add virtual execution elements of remote clusters (e.g., pod 22X) as endpoints of a duplicate of network service 58 network controller created in network cluster 170B (not shown) by assigning an IP address to the virtual execution elements associated with the duplicate of network service 58 created in network cluster 170B. In this example, network controller 24 may store the IP addresses of the endpoints for network service 58—as well as IP addresses of endpoints of duplicates of network service 58 created in the plurality of network clusters—in a DNS server to allow network service 58 to implement policies associated with forwarding network traffic for the network application running on the endpoints of network service 58. However, the DNS server may have a long time to live (TTL) for endpoint references, which may delay operation of the SDN as endpoints are created or removed to accommodate the dynamic nature of network traffic loads. For example, network controller 24 may have added pod 22X as an endpoint to network service 58 and stored the assigned IP address in a DNS server. However, pod 22X may be deleted and network service 58 would have to wait for the DNS server to be updated in order to effectively implement a policy that, for example, load balances network traffic of a network application. Administrators of the SDN do not have control over the DNS server and have less autonomy when customizing the SDN.

In other examples, administrators of an SDN may develop and maintain a service mesh network according to a proprietary protocol to add virtual execution elements of remote clusters (e.g., pod 22X) as endpoints of a network service (e.g., network service 58). A service mesh network would include a series of upstream and downstream routers (e.g., chassis switches 18 and TOR switches 16) that convey endpoint creation requests for network service 58 and enable endpoints of network service 58 to communicate (e.g., forward network traffic) via a series of next hops. However, service mesh networks can be complex and difficult to maintain with large SDNs. Service mesh networks also require more compute and network resources by constantly relaying requests and network traffic in incremental next hops between upstream and downstream routers. In comparison to using a DNS server or a service mesh network, the techniques described herein use a well-established routing protocol that executes efficiently. The techniques reduce computational overhead (e.g., processing cycles consumed, memory, memory bus bandwidth, or other computational resources associated with power consumption) to allow for reliable and efficient service advertisement, while improving the operation of the underlying endpoints running a network application.

In accordance with techniques of this disclosure, a network cluster (e.g., network cluster 170A) may execute a network service (e.g., NS 58) and advertise information of the network service to remote network clusters (e.g., network cluster 170B) to add virtual execution elements (e.g., pod 22X) of the remote network clusters as endpoints of the network service. In the example of FIG. 1, orchestrator 23 may establish first network cluster 170A to include virtual network 50A, virtual network router 52A, chassis switch 18A, TOR switch 16A, and server 12A. Orchestrator 23 may establish second network cluster 170B to include virtual network 50N, virtual network router 52N, chassis switch 18M, TOR switch 16N, and server 12X. In addition, orchestrator 23 may add pod 22A as an endpoint of network service 58 executing in first network cluster 170A, where network service 58 exposes—to the container orchestration platform of the SDN—a backend of a network application running on endpoints of network service 58. In some examples, control node 32 of first network cluster 170A may generate the advertisement that includes information of network service 58 (e.g., FQDN of the network service, port used by the network service, and protocol used by the network service). In some examples, the first network cluster and the second network cluster may share the same hardware elements.

Rather than relying on an external DNS server or developing and maintaining a complex service mesh network to add pod 22X as an endpoint to network service 58, a control node of control 32 distributed to first network cluster 170A may generate advertisements with information of network service 58 and transmit the advertisement to second network cluster 170B to add pod 22X as an endpoint of network service 58. The control node of control 32 distributed to first network cluster 170A may generate advertisements with information of network service 58 that conforms to a network routing protocol (such as a border gateway routing protocol) that is normally used for advertising routes in a network or between networks (along with other routing specific information. First network cluster 170A and second network cluster 170B may be peered together directly or indirectly via intermediate BGP routers and exchange routing information (e.g., IP addresses) to establish communication between virtual execution elements of first network cluster 170A (e.g., pod 22A) and virtual execution elements of second network cluster 170B (e.g., pod 22X) added as endpoints of network service 58.

In operation, first network cluster 170A generates an advertisement that conforms to a routing protocol and comprises information of network service 58 executing in first network cluster 170A. First network cluster 170A may include a fully qualified domain name (FQDN) of network service 58, as well as the port and protocol used by network service 58, in an advertisement conforming to an established routing protocol to add virtual execution elements of remote network clusters (e.g., pod 22X) as endpoints of network service 58. First network cluster 170A may use a BGP controller of a control node of control 32 to generate the advertisement according to a BGP protocol, such as MP-BGP. First network cluster 170A may also include community attributes of the BGP protocol in the generated advertisement.

First network cluster 170A may include a first BGP router or controller that transmits the generated advertisement to a second BGP router or controller of second network cluster 170B. First network cluster 170A may transmit the generated advertisement to second network cluster 170B to conform with MP-BGP. First network cluster 170A may transmit the generated advertisement to second network cluster 170B as a request to add pod 22X as an endpoint of network service 58. Second network cluster 170B may receive the advertisement via a second BGP router or controller of a control node of control 32 distributed to second network cluster 170B.

Second network cluster 170B may generate network service directory 62 based on the information of network service 58 included in the advertisement generated from first network cluster 170A. Second network cluster 170B may use a configuration node of configuration 30 distributed to second network cluster 170B to generate network service directory 62. Second network cluster 170B may also use network controller 24 to receive and process the advertisement transmitted from first network cluster 170A. Network controller 24 may generate network service directory 62 in virtual network 50N executing in second network cluster 170B. Network controller 24 may also use an API (e.g., kube-api) to generate network service directory 62. Network service directory 62 may be a copy of network service 58 in terms of the fully qualified domain name, port, and protocol network service directory 62 is instantiated with.

Network controller 24 may use network service directory 62 to add one or more virtual execution element of second network cluster 170B (e.g., pod 22X) as endpoints of network service 58 executing on first network cluster 170B to establish communication between the endpoints of network service 58 via virtual router 21. Network controller 24 may use network service directory 62 to assign an IP address to pod 22X of second network cluster 170B based on the information of network service 58 included in the advertisement received by second network cluster 170B. Virtual router 21 may include a routing table that stores the IP addresses assigned to pod 22A and pod 22X when pod 22A and pod 22X were added as endpoints of network service 58, thereby enabling pod 22A of first network cluster 170A and pod 22X of second network cluster 170B to efficiently communicate (e.g., load balancing network traffic or processing requirements for a network application exposed by network service 58). Virtual router 21 storing the IP address assigned to pod 22X based on network service directory 62 avoids the need of using a DNS server or service mesh network because pod 22X may directly communicate with other endpoints of network service 58 (e.g., pod 22A) through virtual router 21. Rather than network service 58 communicating with a DNS server to load balance network traffic or processing requirements of a network application exposed by network service 58 between pod 22A of first network cluster 170A and pod 22X of second network cluster 170B, network service 58 may load balance network traffic or processing requirement of the network application between pod 22A and pod 22X by using a routing table of assigned IP addresses of pod 22A and pod 22X stored in virtual router 21. Additionally, network service 58 does not have to rely on a plurality of intermediary routers between first network cluster 170A and second network cluster 170B defined by a service mesh network, rather network service 58 only needs access to IP addresses stored in virtual router 21.

As such, the techniques may enable pod 22A of first network cluster 170A and pod 22X of second network cluster 170B to directly communicate at the IP level controlled by virtual router 21, rather than using a DNS server or upstream routers with numerous amounts of next hopes defined by a service mesh network. Network controller 24 may utilize established protocols to efficiently establish pod 22X of second network cluster 170B as endpoints of network service 58 of first network cluster 170A, without requiring external hardware like a DNS server or without requiring the development of a service mesh network. Considering that network routing protocols have been used in networks and undergone extensive testing and troubleshooting to provide consistent operation in a wide variety of different network topologies, while also having a well-defined suite of software and/or hardware implementations, the network routing protocol may provide for lightweight and efficient (e.g., in terms of computing utilization) advertising of information associated with network service 58 between first network cluster 170A and remote network clusters, such as second network cluster 170B. The techniques described herein allow administrators of SDNs greater control of which virtual execution elements (e.g., pod 22A and pod 22X) run a network application exposed by network service 58, without requiring a DNS server or the development of complex service meshes.

Figure 2:
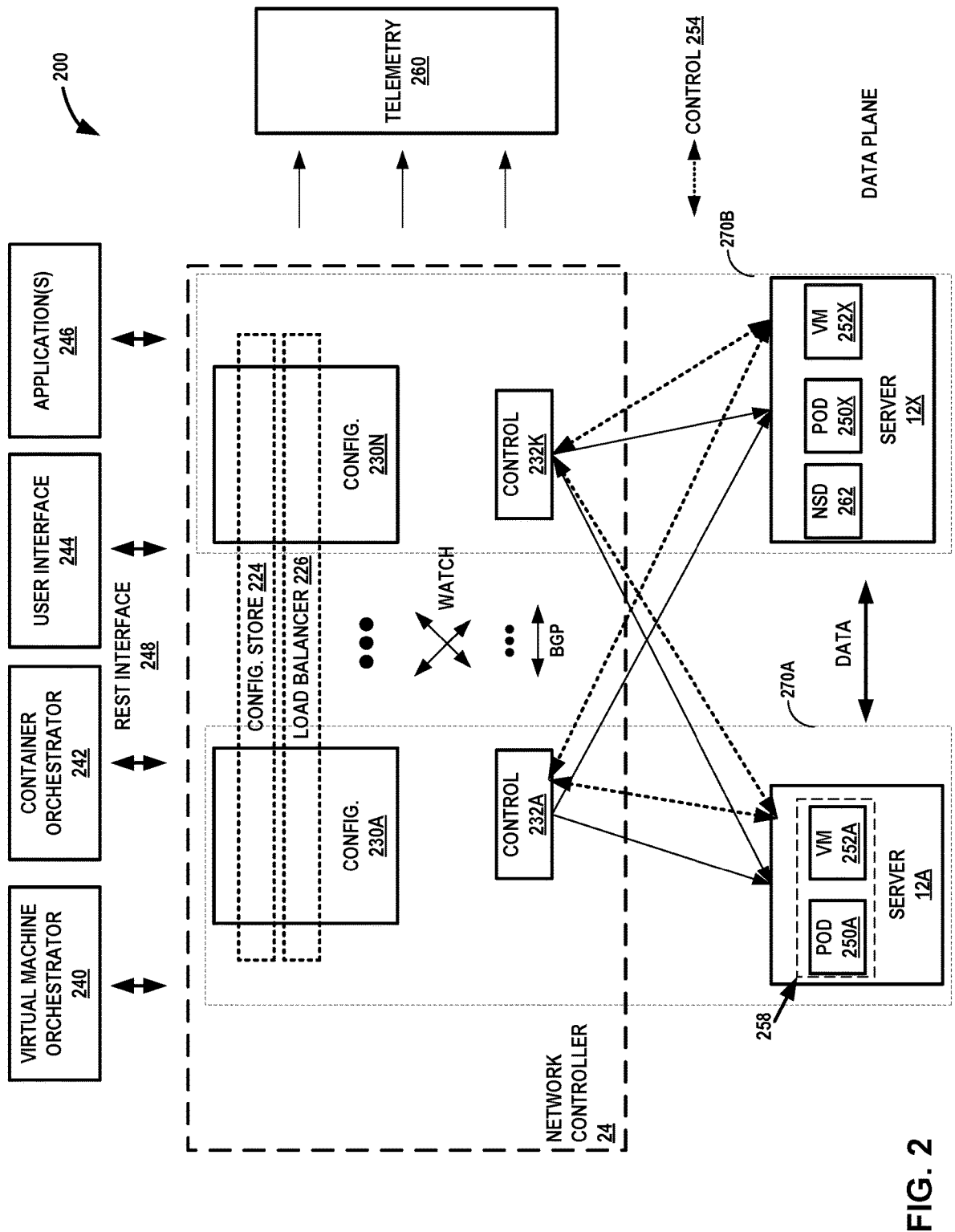
FIG. 2 is a block diagram illustrating an example of a cloud-native SDN architecture for cloud native networking, in accordance with techniques of this disclosure.

FIG. 2 is a block diagram illustrating an example of a cloud-native SDN architecture 200 for cloud native networking, in accordance with techniques of this disclosure. SDN architecture 200 is illustrated in a manner that abstracts underlying connectivity among the various components. In this example, network controller 24 of SDN architecture 200 includes configuration nodes 230A-230N ("configuration nodes" or "config nodes" and collectively, "configuration nodes 230") and control nodes 232A-232K (collectively, "control nodes 232"). Configuration nodes 230 and control nodes 232 may represent examples implementations of configuration nodes 30 and control nodes 32 of FIG. 1, respectively. Configuration nodes 230 and control nodes 232, although illustrated as separate from servers 12, may be executed as one or more workloads on servers 12.

Configuration nodes 230 offer northbound, Representational State Transfer (REST) interfaces to support intent-driven configuration of SDN architecture 200. Example platforms and applications that may be used to push intents to configuration nodes 230 include virtual machine orchestrator 240 (e.g., Openstack), container orchestrator 242 (e.g., Kubernetes), user interface 242, or other one or more application(s) 246. In some examples, SDN architecture 200 has Kubernetes as its base platform.

SDN architecture 200 is divided into a configuration plane, control plane, and data plane, along with an optional telemetry (or analytics) plane. The configuration plane is implemented with horizontally scalable configuration nodes 230, the control plane is implemented with horizontally scalable control nodes 232, and the data plane is implemented with compute nodes. SDN architecture may also distribute configuration nodes 230, control nodes 232, and servers 12 across multiple clusters.

At a high level, configuration nodes 230 uses configuration store 224 to manage the state of configuration resources of SDN architecture 200. In general, a configuration resource (or more simply "resource") is a named object schema that includes data and/or methods that describe the custom resource, and an application programming interface (API) is defined for creating and manipulating the data through an API server. A kind is the name of an object schema. Configuration resources may include Kubernetes native resources, such as Pod, Ingress, Configmap, Service, Role, Namespace, Node, Networkpolicy, or LoadBalancer.

Configuration resources also include custom resources, which are used to extend the Kubernetes platform by defining an application program interface (API) that may not be available in a default installation of the Kubernetes platform. In the example of SDN architecture 200, custom resources may describe physical infrastructure, virtual infrastructure (e.g., VNs 50 and/or VNRs 52), configurations, and/or other resources of SDN architecture 200. As part of the configuration and operation SDN architecture 200, various custom resources may be instantiated (e.g., VNRs 52 within vRouter 21). Instantiated resources (whether native or custom) may be referred to as objects or as instances of the resource, which are persistent entities in SDN architecture 200 that represent an intent (desired state) and the status (actual state) of the SDN architecture 200.

Configuration nodes 230 provide an aggregated API for performing operations on (i.e., creating, reading, updating, and deleting) configuration resources of SDN architecture 200 in configuration store 224. Load balancer 226 represents one or more load balancer objects that load balance configuration requests among configuration nodes 230. Configuration store 224 may represent one or more etcd databases. Configuration nodes 230 may be implemented using Nginx.

SDN architecture 200 may provide networking for both Openstack and Kubernetes. Openstack uses a plugin architecture to support networking. With virtual machine orchestrator 240 that is Openstack, the Openstack networking plugin driver converts Openstack configuration objects to SDN architecture 200 configuration objects (resources). Compute nodes run Openstack nova to bring up virtual machines.

With container orchestrator 242 that is Kubernetes, SDN architecture 200 functions as a Kubernetes CNI. As noted above, Kubernetes native resources (pod, services, ingress, external load balancer, etc.) may be supported, and SDN architecture 200 may support custom resources for Kubernetes for advanced networking and security for SDN architecture 200.

Configuration nodes 230 offer REST watch to control nodes 232 to watch for configuration resource changes, which control nodes 232 effect within the computing infrastructure. Control nodes 232 receive configuration resource data from configuration nodes 230, by watching resources, and build a full configuration graph. A given one of control nodes 232 consumes configuration resource data relevant for the control nodes and distributes required configurations to the compute nodes (servers 12) via control interfaces 254 to the control plane aspect of virtual router 21 (i.e., the virtual router agent—not shown in FIG. 1). Any of compute nodes 232 may receive only a partial graph, as is required for processing. Control interfaces 254 may be XMPP. The number of configuration nodes 230 and control nodes 232 that are deployed may be a function of the number of clusters supported. To support high availability, the configuration plane may include 2N+1 configuration nodes 230 and 2N control nodes 232.

Control nodes 232 may be in different network clusters and distribute routes among the compute nodes within the respective cluster. Control node 232 may use MP-BGP to exchange routes among control nodes 232 of different clusters, and control nodes 232 may peer with any external BGP supported gateways or other routers. Control nodes 232 may use a route reflector.

In the example of FIG. 2, configuration node 230A, control node 232A, and server 12A may be deployed as (or in other words, configured to support) first network cluster 270A. Configuration node 230N, control node 232K, and server 12X may be deployed or otherwise configured to support second network cluster 270B. In some examples first network cluster 270A and second network cluster 270B may share hardware components (e.g., components of network controller 24).

Pods 250 and virtual machines 252 are examples of workloads that may be deployed to the compute nodes by container orchestrator 242 or virtual machine orchestrator 240, respectively, and interconnected by SDN architecture 200 using one or more virtual networks. In some examples, pod 250A and virtual machine 252A may be endpoints of network service 258. Network service 258 may be any collection of virtual execution elements added as endpoints used for running one or more applications 246. In the example of FIG. 2, network service 258 may initially be configured to include pod 250A and virtual machine 252A as endpoints to run application 246.

In operation, control node 232A of first network cluster 270A may generate an advertisement—conforming to a BGP protocol (e.g., MP-BGP)—that includes information of network service 258. Control node 232A may include a first BGP controller or router for crafting the advertisement to include information of network service 258, such as a fully qualified domain name (FQDN) of network service 258, as well as a port and protocol used by network service 258.

Control node 232A may broadcast or transmit the advertisement—with information of network service 258—to control node 232K of second network cluster 270B according to a protocol (e.g., MP-BGP). Control node 232K of second network cluster 270B may include a second BGP controller or router for receiving and processing advertisements sent from other BGP controllers or routers of remote network clusters (e.g., the BGP controller or router of control node 232A).

Control node 232K may relay the obtained information of network service 258 to configuration node 230N to generate network service directory 262. Configuration node 230N may generate network service directory 262 to be a copy of network service 258. Network service directory 262 may be a copy of network service directory 262 by configuration node 230N instantiating network service directory 262 with the obtained information of network service 258 (e.g., FQDN of network service 258, a port used by network service 258, and a protocol used by network service 258).

In some examples, control node 232K may use the second BGP router or controller of second network cluster 270B to determine whether the advertisement received from control node 232A includes a label or tag indicating a community in which second network cluster 270B is a member. If control node 232K determines that the advertisement sent from control node 232A includes a label or tag of a community in which second network cluster 270B is not a member, control node 232K ignores the advertisement. In response to control node 232K determining second network cluster 270B is part of the community identified in a label or tag included in the advertisement sent from control node 232A, control node 232K may relay the information of network service 258— included in the advertisement—to configuration node 230N. Configuration node 230N may then generate network service directory 262 based on the obtained information of network service 258. Network service directory 262 may be, for example, an Atlas Kubernetes Operator service.

Network service directory 262 may request network controller 24 to add pod 250X and/or VM 252X as endpoints of network service 258 to enable pod 250A and VM 252A to directly communicate with pod 250X and/or VM 252X via a virtual router. Network controller 24 may use a mapping controller to add pod 250X and/or VM 252X as endpoints of network service 258 by assigning a floating IP address to pod 250X and/or VM 252X. Network controller 24 may use the mapping controller to statically or dynamically assign a floating IP address to pod 250X and/or VM 252X based on the FQDN, port, and protocol of network service 258 used to instantiate network service directory 262. Network controller 24 may include the floating IP addresses assigned to pod 250X and/or VM 252X in a routing table of one or more virtual routers to enable communication between all the endpoints (e.g., pod 250A, VM 252A, pod 250X, and VM 252X) running one or more applications 246, regardless of the network cluster an endpoint is located in.

The techniques described herein allow direct communication between one or more virtual execution elements (e.g., pod 250A, VM 252A, pod 250X, and VM 252X) used to run one or more network applications 246 exposed by network service 258, without relying on an external DNS server or developing complex service mesh networks. By leveraging a well-established protocol (e.g., BGP) to advertise information of network service 258, administrators of SDNs may efficiently add pod 250X and virtual machine 252X of second network cluster 270B, for example, as backend endpoints running one or more network applications 246 exposed by network service 258, without using a DNS server of service mesh network. Network controller 24 may add pod 250X and VM 252X as endpoints of network service 258 exposing one or more network applications 246 based on information of network service 258 included in the advertisement used to instantiate network service directory 262. Network controller 24 does not need to add pod 250X or VM 252X as endpoints of network service 258 with a DNS server or a service mesh network defining a series of routers connecting first network cluster 170A and second network cluster 170B because network controller 24 need only to generate network service directory 262 as a reference to how IP addresses should be assigned to pod 250X and VM 252X when adding pod 250X and VM 252X as endpoints of network service 258. Once network controller 24 assigns IP addresses pod 250X and VM 252X based on network service directory 262, network controller 24 stores the IP addresses in a virtual router to enable direct communication between all endpoints of network service 258 (e.g., pod 250A, VM 252A, pod 250X, and VM 252X) to load balance network traffic and processing requirements of one or more applications 246 exposed by network service 258.

Figure 3:
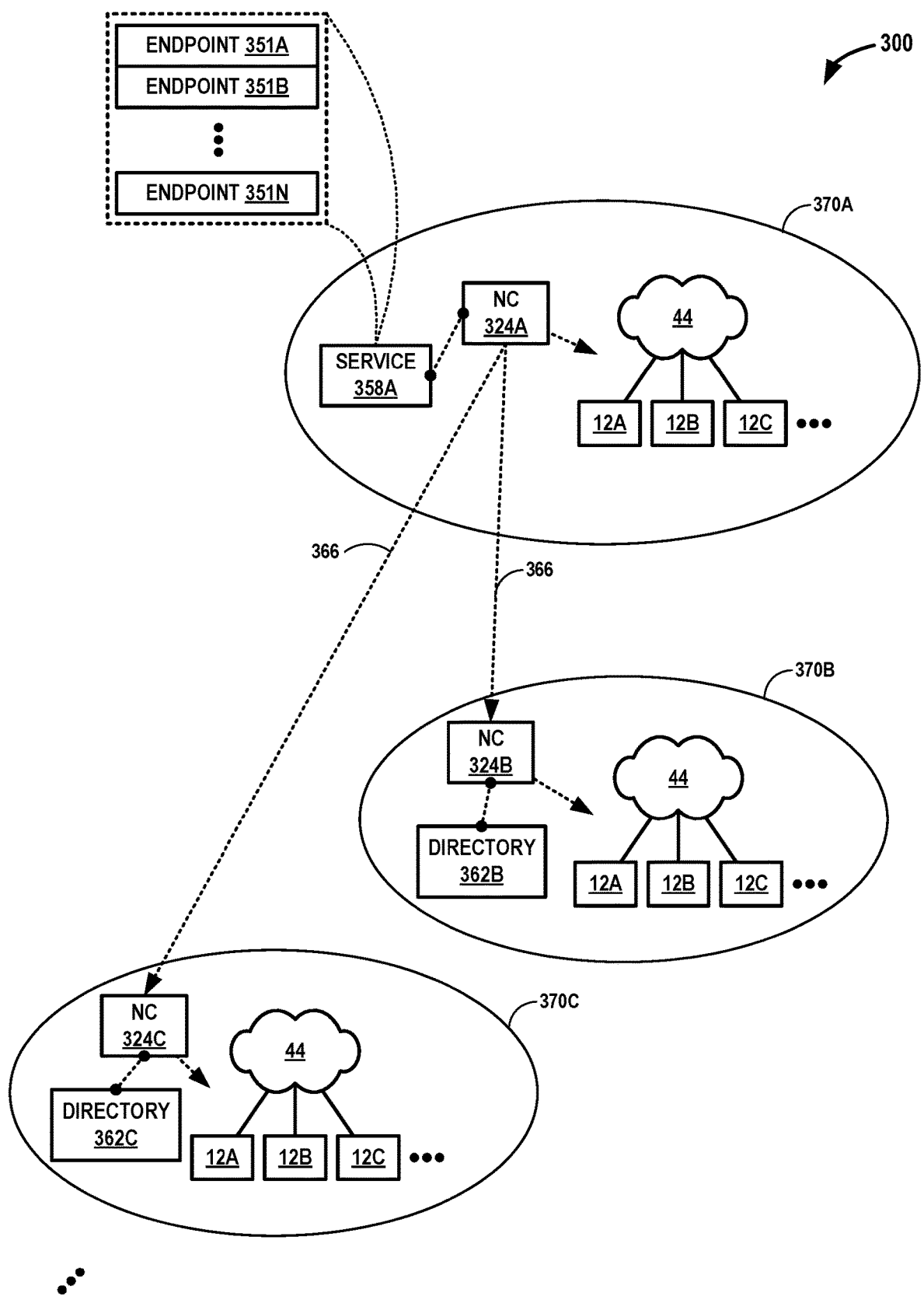
FIG. 3 is a conceptual diagram illustrating an example network with multiple network clusters in accordance with one or more aspects of the present disclosure.

FIG. 3 is a conceptual diagram illustrating an example network 300 with multiple network clusters in accordance with one or more aspects of the present disclosure. The example of FIG. 3 illustrates one or more of software defined networks (SDNs) arranged as cloud-computing cluster 370A, cluster 370B, and cluster 370C (collectively, "clusters 370," and representing any number of clusters). Each of cloud-computing clusters 370 is implemented by computing infrastructure that may be virtualized to support one or services implemented by the cluster. For instance, one or more of clusters 370 may be provisioned on a plurality of servers hosted on a network (e.g., Internet) to store, manage, and process data, or perform other functions.

In some examples, one or more of clusters 370 may be on-premises of an enterprise, where some or all of other clusters 370 are remote. In other examples, some or all of clusters 370 may be remote from the enterprise. Further, in some examples, clusters 370 may all be included within a single data center. In still other examples, each of clusters 370 may be deployed within its own data center, or possibly, one or more of clusters 370 may span multiple data centers or geographic regions. Each of clusters 370 further include a corresponding network 44 and any number of servers (e.g., servers 12A, 12B, and 12C) for providing compute resources. In general, each of components illustrated in FIG. 3 (e.g., clusters 370, network controllers 324 within each of clusters 370, and servers 12 within each of clusters 370) may communicate over one or more networks, which may be or include the internet or any public or private communications network or other network. Such networks may include one or more of networks 44 within clusters 370.

FIG. 3 includes a plurality of software defined network controllers, referred to herein as network controller 324A, 324B, and 370C (collectively, "network controllers 324") each within clusters 370A, 370B, and cluster 130C, respectively. Each of network controllers 324 configure aspects of their respective cluster 370, and may be implemented through a computing device and/or processing circuitry, whether physical or virtual.

In some examples, clusters 370 may include one or more configurable services (e.g., service 358A) to expose an application executing on a set of endpoints. In the example of FIG. 3, service 358A may include endpoint 351A through endpoint 351N (collectively "endpoints 351" and representing any number of endpoints), as well as a policy on making endpoints 351 accessible. Endpoints 351 may be virtual execution elements (e.g., pods or virtual machines) executing on any server (e.g., servers 12A-12C). In some instances, network controller 324A may continuously scan for virtual execution elements executing on any server (e.g., servers 12) within cluster 370A that match a selector defined by service 358A. In response to network controller 324A matching a virtual execution element to a selector defined by service 358A, network controller 324A may add the matched virtual execution element as an endpoint of endpoints 351.

In accordance with one or more aspects of the present disclosure, a network controller 324A (also referred to herein as "NC 324A") may add, through a routing protocol (e.g., MP-BGP), virtual execution elements executing in network cluster 370B and/or network cluster 370C as endpoints 351 of network service 358A (also referred to herein as "network service 358" or "service 358") associated with network controller 324A. For example, NC 324A may generate advertisement 366 to include information of network service 358 according to a MP-BGP routing protocol. Advertisement 366 may include information of a service 358 (e.g., a fully qualified domain name of the service 358, a port used by service 358, a protocol used by service 358, etc.). NC 324A may include a BGP controller or router that crafts advertisement 366. NC324A may use the BGP controller or router to include a community tag or label in advertisement 366 to indicate that advertisement 366 is intended to be received by members of a community.

NC 324A may transmit advertisement 366 to NC 324B of cluster 370B, NC 324C of cluster 370C, and/or any of NC 324. NC 324B, NC 324C, and/or any of NC 324 may ignore the advertisement if the network cluster in which NC 324 resides is not part of a community identified in a community tag or label included in advertisement 366. If NC 324 is configured to support a network cluster that is a member of the community identified in a community tag or label included in advertisement 366, NC 324 may use a BGP controller or router to send information included in advertisement 366 to a mapping controller in NC 324.

Each NC 324 that receives advertisement 366 may generate a network service directory (e.g., directory 362B or 362C, collectively directories 362) based on the information of service 358A included in advertisement 366. NC 324 may configure directories 362 with the information of service 358A included in advertisement 366. In some example, NC 324 may generate directories 362 as a service without selectors.

Directories 362 executing in network cluster 370B and network cluster 370C (e.g., directory 362B or 362C) may add virtual execution elements executing in the respective network cluster as endpoints 351 of service 358A. In some examples, directories 362 may be a service instance without a selector. In such examples, directories 362 can add virtual execution elements of each respective network cluster as endpoints of service 358. NC 324 may use a mapping controller to map directories 362 to a network address and port of service 358A included in advertisement 366. NC 324 may use the mapping controller to add IP addresses of virtual execution elements in the respective network cluster as endpoints 351 of service 358A based on a label assigned to directories 362. NC 324 may assign a label to directories 362 that matches the name of service 358A.

The techniques described herein allow for network controller 324A to advertise information of network service 358 to network cluster 370B and network cluster 370C to add virtual execution elements of network cluster 370B and network cluster 370C as an endpoint of endpoints 351 of network service 358 used to expose a network application.

Once network controller 324B and/or network controller 324C add virtual execution elements of network cluster 370B and network cluster 370C, respectively, network controller 324A may implement load balancing techniques with network service 358 to direct network traffic of a network application exposed by network service 358 to the endpoints 351 assigned to network service 358. For example, NC 324A may use a virtual IP (e.g., kube-vip for Kubernetes clusters) and load balancers (e.g., Kubernetes load balancing policy settings) to efficiently regulate ingress and egress traffic of endpoints 351 running a network application based on IP addresses assigned to each endpoint of endpoints 351 stored in a virtual router (e.g., virtual router 21 of FIG. 1).

In some examples, advertisement 366 may adhere to any type of BGP routing protocol (or other type of routing protocol) and allow service 358A to take advantage of attributes included in the BGP routing protocol. For example, network controller 324A, or any other controller within the distributed network, may establish BGP communities or extended communities associated with network traffic of a network application exposed by service 358A. Network controller 324A may establish BGP communities to include community members (e.g., network cluster 370B and/or network cluster 370C) and allow community members to cooperate when processing network traffic routes. For example, network controller 324A may establish a BGP community to include community attributes that can be leveraged by a routing policy to automatically determine routing decisions. Once network cluster 370B and/or network cluster 370C add virtual execution elements as endpoints of endpoints 351 based on advertisement 366 and directories 362, network controller 324B and network controller 324C may push a routing policy to the newly added endpoints according to the community attributes specified in advertisement 366. The routing policy may use a matching condition to enable import or export statements for particular ingress and egress network traffic.

Advertisement 366 may include Network Layer Reachability Information (NLRI) that includes information of service 358A by adding a new network layer protocol. Advertisement 366 may include NLRI encoding a tuple that may include a fully qualified domain name (FQDN) of service 358A, a port used by service 358A, and a protocol used by service 358A. Network controllers 324B and 324C may receive the NLRI via advertisement 366 and establish directories 362 with the FQDN and add endpoints to service 358A by configuring one or more virtual execution elements with the encoded port and protocol in the NLRI. Network controllers 324B and 324C may add endpoints to service 358A by instructing directories 362 to assign floating IP addresses configured as endpoints of service 358A to each virtual execution element added as an endpoint to service 358A.

Figure 4:
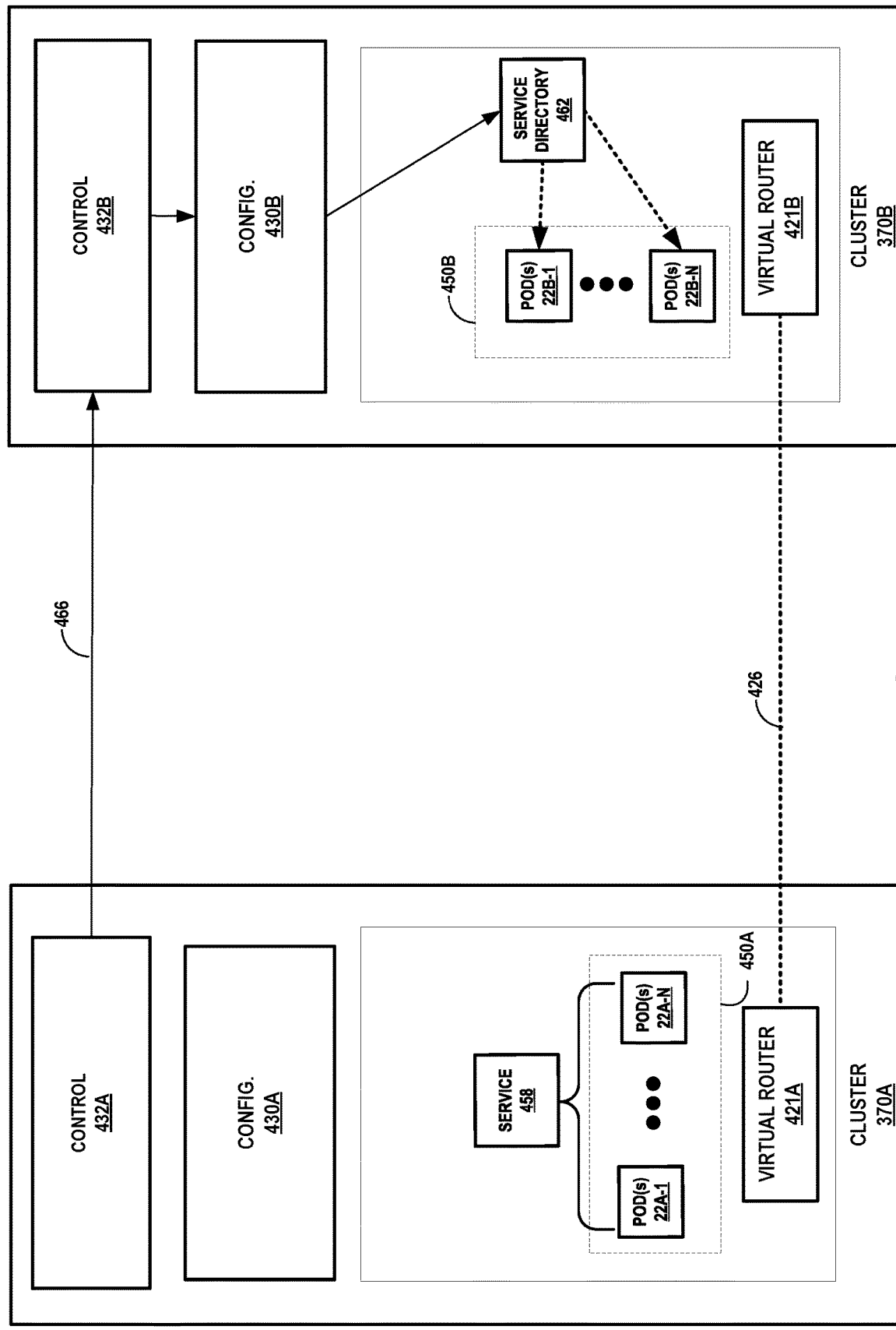
FIG. 4. is a block diagram illustrating an example network with multiple network clusters in accordance with one or more aspects of the present disclosure.

FIG. 4. is a block diagram illustrating an example network with multiple network clusters in accordance with one or more aspects of the present disclosure. As in FIG. 1, FIG. 2 and FIG. 3, many of the components illustrated in FIG. 4 may correspond to like-numbered elements previously described in connection with FIG. 1 and FIG. 2. In general, such like-numbered systems, devices, components, and items illustrated in FIG. 4 may be described in a manner consistent with the description provided in connection with FIG. 1 and FIG. 2, although in some examples such systems, devices, components, and items may involve alternative implementations with more, fewer, and/or different capabilities.

In the example of FIG. 4 network cluster 370A and network cluster 370B may include control nodes 432, configuration nodes 430, and virtual routers 421. Control nodes 432 may represent, for example, control node 32 of FIG. 1 or control nodes 232 of FIG. 2. Configuration nodes 430 may represent, as an example, configuration node 30 of FIG. 1 or configuration nodes 230 of FIG. 2. Virtual router 421 may represent, in the example of FIG. 4, virtual router 21 of FIG. 1. Network cluster 370A may execute an application that runs on virtual execution elements added as endpoints of network service 458. Network service 458 may execute the application with a plurality of endpoints, such as pods 22A-1 through pods 22A-N. In some examples, pods 22A-1 through pods 22A-N may be in virtual network 450A.

In accordance with techniques of this disclosure, control node 432A executing in network cluster 370A may generate advertisement 466 according to a protocol, such as MP-BGP. Advertisement 466 may include information of network service 458 or BGP extended community attributes, as described previously.

Control node 432A may transmit advertisement 466 to control node 432B. Control node 432B may call a client library (e.g., Kubernetes client library) executing in control node 432B in response to receiving advertisement 466. Control node 432B may use the client library to send a service directory and endpoint creation request to configuration node 430B. Configuration node 430B may use an API (e.g., kube-api) to generate network service directory 462 based on the information of network service 458 included in advertisement 466.

Network service directory 462 may assign one or more virtual execution elements (e.g., pods 22B-1 through pods 22B-N) executing in network cluster 370B as endpoints of network service 458. In some examples, pods 22B-1 through pods 22B-N may be in virtual network 450B. In some instances, control node 432A may transmit advertisement 466 to control node 432B with one or more community attributes (e.g., BGP extended communities). Network service directory 462 may be instantiated in accordance to community attributes included in advertisement 466. Configuration node 430B may use network service directory 462 to add pods 22B-1 through pods 22B-N (collectively referred to herein as "pods 22B") of network cluster 370B as endpoints of network service 458 by assigning pods 22B an IP address based on the information included in advertisement 466. Configuration node 430B may attach the community indicated in advertisement 466 to the IP addresses assigned to pods 22B added as endpoints of network service 458. Configuration node 430B may then store the assigned IP addresses in virtual routers 421 to support native direct communication (e.g., native load balancing supported in Kubernetes) without the use of a DNS server or service mesh network.

In some instances, control node 432B may send the network service directory and endpoint creation request with a routing policy that maps community attributes for routing decisions (e.g., acceptance, rejection, preference, or redistribution of network traffic). Control nodes 432 may create a routing policy that is implemented by configuration nodes 430B. The routing policy may apply to ingress and egress routes and evaluate network traffic for service 458 based on tags associated with BGP community attributes. For example, control nodes 432 may create a routing policy to evaluate network traffic routes of service 458 based on match conditions of import and export statements defined in the routing policy.

In the example of FIG. 4, configuration nodes 430 may implement a routing policy that links the routing tables associated with virtual routers 421A and 421B to create a virtual network service-cluster 426. Configuration nodes 430 may establish virtual network service-cluster 426 by linking a virtual routing and forwarding (VRF) table of virtual network 450A stored in virtual router 421A to a VRF table of virtual network 450B stored in virtual router 421B. Configuration nodes 430 link a VRF table of virtual network 450A to a VRF table of virtual network 450B by including a VRF routing instance for virtual network 450A and virtual network 450B in each of virtual router 421A and virtual router 421B. Virtual router 421A and virtual router 421B may then be configured to initiate an Internet Protocol (IP) session between endpoints in virtual network 450A and endpoints in virtual network 450B. In some examples, virtual network service-cluster 426 may be established through the same protocol (MP-BGP) as was used to generate advertisement 466. In these examples, once pods 22B-1 through 22B-N are added as endpoints to network service 458, control nodes 432A and 432B may distribute labeled network traffic routes—via MP-BGP for example—of the network application exposed by network service 458 to each other according, for example, to a load balancing policy implemented by network service 458. When either control node 432A or 432B receives the labeled network traffic routes, control node 432A or 432B may further distribute—via MP-IBGP for example—the labeled network traffic routes to virtual routers 421A or 421B, respectively, or to a route reflector. Virtual router 421A or 421B may appropriately send the network traffic associated with the labeled network traffic routes to an endpoint of service 458 (e.g., pods 22A or pods 22B) based on the VRF tables stored in virtual routers 421A and 421B. Virtual routers 421A and 421B may be configured to support next generation Layer 3 virtual networks by, for example, configuring virtual routers 421 with next generation layer 3 VPN options A, B, or C. For example, virtual routers 421 may be configured with next generation layer 3 VPN option B to maintain network traffic routes for service 458 in a routing information base (RIB) and IP prefixes of assigned endpoints—including endpoints assigned by service directory 462—in a forwarding information base (FIB). Each of virtual routers 421 may correlate network traffic routes for service 458 stored in the RIB with endpoints floating IP prefixes stored in the FIB to send or receive network traffic for service 458 to endpoints of service 458 according to an implemented routing protocol.

Figure 5:
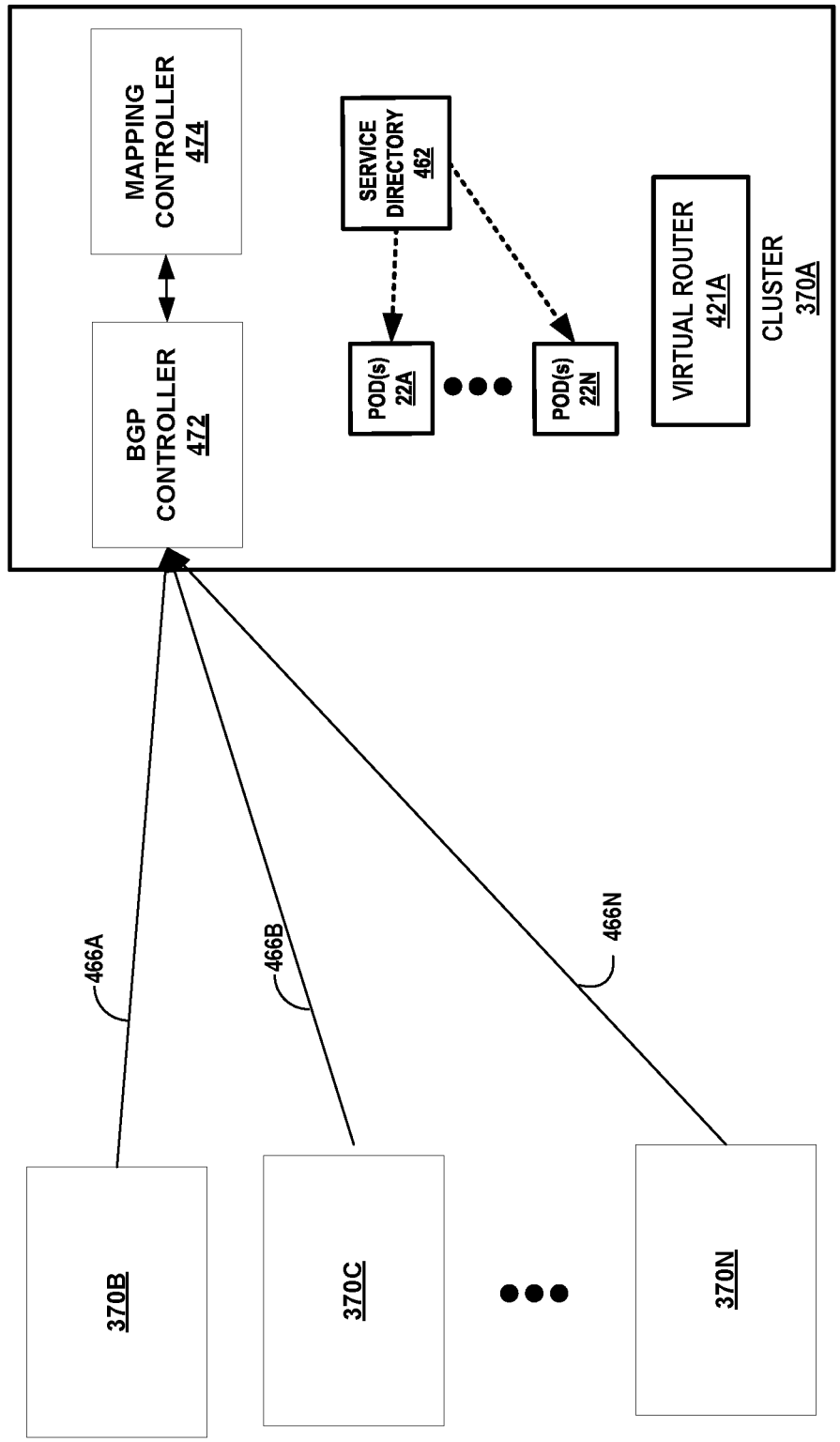
FIG. 5 is a block diagram illustrating an example network in accordance with one or more aspects of the present disclosure.

FIG. 5 is a block diagram illustrating an example network in accordance with one or more aspects of the present disclosure. In the example of FIG. 5, BGP controller 472 and mapping controller 474 may be a part of or implemented by one or more network controllers (e.g., network controller 24 of FIG. 1 or network controllers 324 of FIG. 3). BGP controller 472 and mapping controller 474 may be deployed in a single network cluster (e.g., network cluster 370A) to generate, receive, or perform other networking actions based on advertisements 466 sent from BGP controllers deployed in remote network clusters (e.g., network clusters 370B through 370N).

In some examples, network clusters 370B through 370N may generate and transmit advertisement 466A through advertisement 466N (collectively advertisements 466), respectively. Advertisements 466 may include a label or tag indicating a community (e.g., BGP extended community) in which the network cluster that generated the advertisement is a member of. For example, BGP controller 472 may determine whether advertisements 466 include a tag or label indicating a community in which network cluster 370A is a member. In response to BGP controller 472 determining an advertisement of advertisements 466 includes a tag or label indicating a community in which network cluster 370A is not a member, BGP controller 472 may ignore the advertisement. In response to BGP controller 472 determining an advertisement of advertisements 466 includes a tag or label identifying a community in which network cluster 370A is a member, BGP controller 472 may send instructions to a configuration node (e.g., configuration node 30 of FIG. 1) to create network service directory 462. BGP controller 472 may instruct the configuration node to instantiate network service directory 462 with network service information included in an advertisement of advertisements 466.

BGP controller 472 may also send instructions to the configuration node to assign virtual execution elements (e.g., pods 22A through pods 22N) as endpoints of a network service executing in the remote network cluster (e.g., network clusters 370B through 370N) that sent the advertisement of advertisements 466. BGP controller 472 may also instruct mapping controller 474 to select which virtual execution elements (e.g., any of pods 22A through 22N) will be added as endpoints of the network service associated with the advertisement of advertisements 466. Mapping controller 474 may assign IP addresses to one or more virtual execution elements (e.g., pods 22A through pods 22N) based on the information of the network service included in the advertisement and used to instantiate network service directory 462. Mapping controller 474 may also store the assigned IP addresses in a routing table of virtual router 421A to enable communication between all endpoints of the network service associated with the advertisement.

Figure 6:
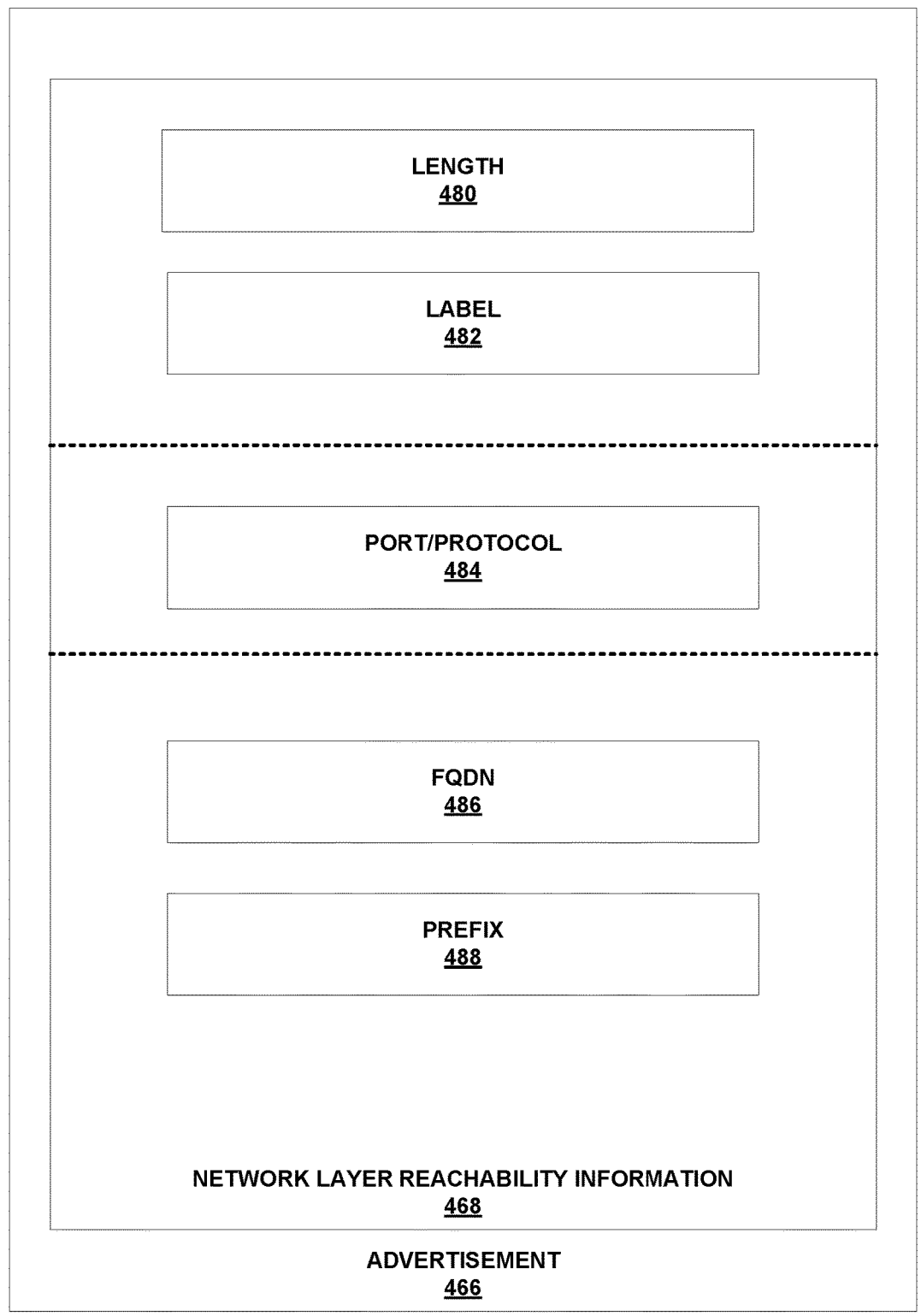
FIG. 6 is a conceptual diagram illustrating an example advertisement with an example network layer reachability information in accordance with one or more aspects of the present disclosure.

FIG. 6 is a conceptual diagram illustrating an example advertisement 466 with an example network layer reachability information 468 in accordance with one or more aspects of the present disclosure. In some instances, network layer reachability information (NLRI) 468 illustrated in FIG. 6 may be the information included in advertisement 466. Advertisement 466 may be generated by a BGP controller (e.g., BGP controller 472 of FIG. 5), a control node (e.g., control node 32 of FIG. 1), or a network controller (network controller 24 of FIG. 1). Advertisement 466 may be in accordance with an established protocol, such as MP-BGP.

In accordance with the techniques of this disclosure, advertisement 466 may include address family identifier, subsequent address family identifier, length of next hop network address, network address of next hop, a reserved portion, and NLRI 468. NLRI 468 is a variable length field that lists network layer reachability information for feasible routes that being advertised. NLRI 468 may have semantics identified by a combination of an address family identifier field and a subsequent address family identifier field included in advertisement 466.

NLRI 468 may include length field 480 that may indicate the length, in bits, of the address prefix in addition to one or more labels. NLRI 468 may include label field 482 that may include one or more labels (e.g., a stack of labels defined in MPLS-ENCAPS) that are encoded as three octets. NLRI 468 may include port/protocol field 484 that may define a IANA port used by a network service. NLRI 468 may include fully qualified domain name (FQDN) field 486 defining a fully qualified host name of the network service and associated with the prefix. NLRI 468 may include prefix field 488 that may include an address prefix followed by enough trailing bits to make the end of the field fall on an octet boundary.

Figure 7:
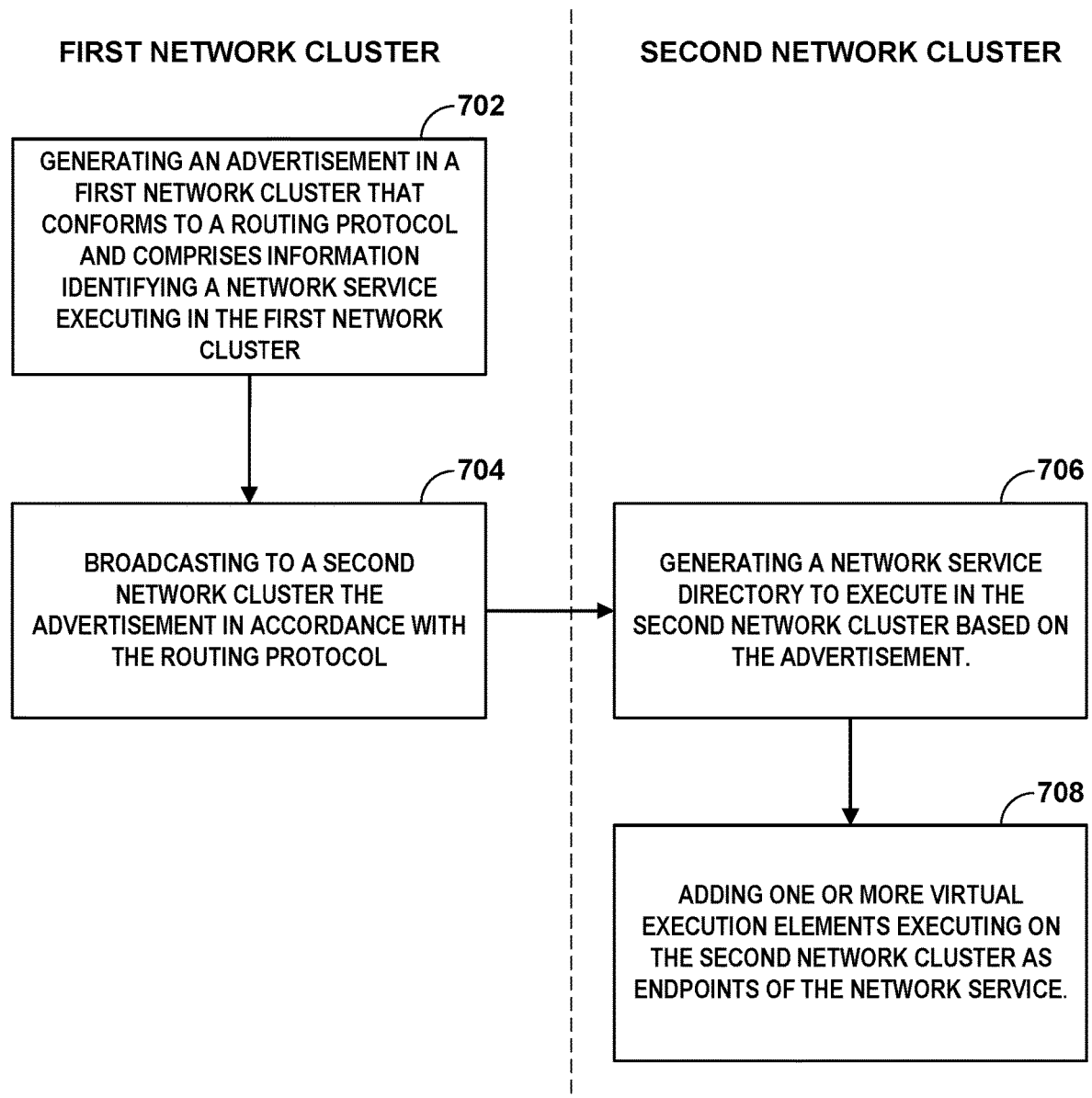
FIG. 7 is a flowchart illustrating an example process for assigning virtual execution elements of a remote network cluster as endpoints of a network service with a routing protocol according to techniques of this disclosure.

FIG. 7 is a flowchart illustrating an example process for assigning virtual execution elements of a remote network cluster as endpoints of a network service with a routing protocol according to techniques of this disclosure. FIG. 7 is discussed with FIGS. 1-6 for example purposes only.

Network controller 24 (or any other network controller described herein, such as network controller 324A) may generate advertisement 466 in first network cluster 170A that conforms to a routing protocol (e.g., MP-BGP), wherein advertisement 466 includes information identifying network service 58 (e.g., NLRI 468), wherein network service 58 is executing in first network cluster 170A (702). First network cluster 170A may be executing within a container orchestration platform of a software defined network (SDN). Network service 58 may expose a backend of a network application (e.g., application 246) to the container orchestration platform of the SDN. Network controller 24 may also broadcast advertisement 466 to second network cluster 170B in accordance with the routing protocol (704). Second network cluster 170B may also be executing in the container orchestration platform of the SDN.

Network controller 24 may generate network service directory 62 to execute in second network cluster 170B based on information included in advertisement 466 (e.g., NLRI 468) (706). Network controller 24 may add one or more virtual execution elements (e.g., pod 250X or VM 252X) executing in second network cluster 170B as endpoints of network service 58 (e.g., endpoints 351) (708). Endpoints 351 may run the network application (e.g., application 246) network service 58 exposes to the container orchestration platform. In some examples, network service 58 may use network controller 24 to implement a network policy (e.g., a network traffic load balancing policy or a network firewall policy) to forward network traffic between endpoints of network service 58 with one or more virtual routers executing in the SDN.

The following examples may illustrate one or more aspects of the disclosure.

Example A1. A computing system comprising processing circuitry having access to a storage device, the processing circuitry configured to: generate, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and broadcast, by the network controller and to a second network cluster executing within the container orchestration platform of the SDN, the advertisement in accordance with the routing protocol.

Example A2. The computing system of example A1, wherein the processing circuitry is further configured to: generate, by the network controller and based on the advertisement, a network service directory in the second network cluster; and add, by the network controller and with the network service directory, one or more virtual execution elements executing on the second network cluster as endpoints of the network service, wherein the endpoints run the network application.

Example A3. The computing system of any combination of examples A1 through A2, wherein the processing circuitry is further configured to: implement a network policy to forward, by one or more virtual routers executing in the SDN, network traffic between endpoints of the network service.

Example A4. The computing system of any combination of examples A1 through A3, wherein the processing circuitry is further configured to implement a network traffic load balancing network policy to forward network traffic between endpoints of the network service.

Example A5. The computing system of any combination of examples A1 through A4, wherein the one or more virtual routers comprise a first virtual router executing in the first network cluster and a second virtual router executing in the second network cluster, and wherein the processing circuitry is further configured to: link a first routing table of the first virtual router a second routing table of the second virtual router to enable communication between endpoints of the network service; and implement a load balancer to regulate network traffic between endpoints of the network service.

Example A6. The computing system of any combination of examples A1 through A5, wherein the routing protocol includes a multi-protocol border gateway protocol (MP-BGP).

Example A7. The computing system of any combination of examples A1 through A6, wherein the processing circuitry is further configured to generate the advertisement to include a tuple of a fully-qualified domain name (FQDN) of the network service, a protocol used by the network service, and a port used by the network service.

Example A8. The computing system of any combination of examples A1 through A7, wherein the processing circuitry is further configured to generate the advertisement and transmit the advertisement with a BGP controller executing in the first network cluster.

Example A9. A method comprising: generating, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and broadcasting, by the network controller and to a second network cluster executing within the container orchestration platform of the SDN, the advertisement in accordance with the routing protocol.

Example A10. The method of example A9, further comprising: generating, by the network controller and based on the advertisement, a network service directory in the second network cluster; adding, by the network controller and with the network service directory, one or more virtual execution elements executing on the second network cluster as endpoints of the network service, wherein the endpoints run the network application; and implementing, by the network controller, a network policy to forward, by one or more virtual routers executing in the SDN, network traffic between endpoints of the network service.

Example A11. The method of any combination of examples A9 through A10, wherein to add the one or more virtual execution elements executing on the second network cluster as endpoints of the network service, the network controller is further configured to: assign, with a configuration node executing in the second network cluster, the one or more virtual execution elements one or more respective internet protocol (IP) addresses based on the network service directory; and store the IP addresses in the one or more virtual routers.

Example A12. The method of any combination of examples A9 through A11, wherein the network controller is further configured to implement a network traffic load balancing network policy to forward network traffic between endpoints of the network service.

Example A13. The method of any combination of examples A9 through A12, wherein the one or more virtual routers comprise a first virtual router executing in the first network cluster and a second virtual router executing in the second network cluster, and wherein the network controller is further configured to: link a first routing table of the first virtual router a second routing table of the second virtual router to enable communication between endpoints of the network service; and implement a load balancer to regulate network traffic between endpoints of the network service.

Example A14. The method of any combination of examples A9 through A13, wherein the routing protocol includes a multi-protocol border gateway protocol (MP-BGP).

Example A15. The method of any combination of examples A9 through A14, wherein the network controller is configured to generate the advertisement to include a tuple of a fully-qualified domain name (FQDN) of the network service, a protocol used by the network service, and a port used by the network service.

Example A16. The method of any combination of examples A9 through A15, wherein the network controller is further configured to generate the advertisement and transmit the advertisement with a BGP controller executing in the first network cluster.

Example A17. A computer-readable storage medium comprising instructions that, when executed, are configured to cause processing circuitry of a network system to: generate, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and broadcast, by the network controller and to a second network cluster executing within the container orchestration platform of the SDN, the advertisement in accordance with the routing protocol.

Example A18. The computer-readable storage medium of example A17, wherein the instructions are further configured to cause the processing circuitry of the network system to: generate, by the network controller and based on the advertisement, a network service directory in the second network cluster; and add, by the network controller and with the network service directory, one or more virtual execution elements executing on the second network cluster as endpoints of the network service, wherein the endpoints run the network application.

Example A19. The computer-readable storage medium of any combination of examples A16 through A17, wherein the routing protocol includes a multi-protocol border gateway protocol (MP-BGP).

Example A20. The computer-readable storage medium of any combination of examples A16 through A18, wherein the advertisement includes a tuple of a fully-qualified domain name (FQDN) of the network service, a protocol used by the network service, and a port used by the network service.

Example B1. A computing system comprising processing circuitry having access to a storage device, the processing circuitry configured to: generate, by a network controller executing in a software defined network (SDN), a network service directory in a first network cluster based on an advertisement, wherein the advertisement conforms to a routing protocol and comprises information identifying a network service executing in a second network cluster, wherein the network service exposes a backend of a network application to the container orchestration platform of the SDN; add, by the network controller, one or more virtual execution elements executing on the first network cluster as endpoints of the network service, wherein the endpoints run the network application; and implement a network policy to forward, by one or more virtual routers executing in the SDN, network traffic between endpoints of the network service.

Example B2. The computing system of example B1, wherein the processing circuitry is further configured to: generate, by the network controller, the advertisement in the second network cluster; and broadcast, by the network controller and to the first network cluster executing within the container orchestration platform of the SDN, the advertisement in accordance with the routing protocol.

Example B3. The computing system of any combination of examples B1 through B2, wherein the processing circuitry is further configured to: implement a network policy to forward, by one or more virtual routers executing in the SDN, network traffic between endpoints of the network service.

Example B4. The computing system of any combination of examples B1 through B3, wherein the processing circuitry is further configured to implement a network traffic load balancing network policy to forward network traffic between endpoints of the network service.

Example B5. The computing system of any combination of examples B1 through B4, wherein the one or more virtual routers comprise a first virtual router executing in the first network cluster and a second virtual router executing in the second network cluster, and wherein the processing circuitry is further configured to: link a first routing table of the first virtual router a second routing table of the second virtual router to enable communication between endpoints of the network service; and implement a load balancer to regulate network traffic between endpoints of the network service.

Example B6. The computing system of any combination of examples B1 through B5, wherein the routing protocol includes a multi-protocol border gateway protocol (MP-BGP).

Example B7. The computing system of any combination of examples B1 through B6, wherein the processing circuitry is further configured to generate the advertisement to include a tuple of a fully-qualified domain name (FQDN) of the network service, a protocol used by the network service, and a port used by the network service.

Example B8. The computing system of any combination of examples B1 through B7, wherein the processing circuitry is further configured to receive the advertisement with a BGP controller executing in the first network cluster.

Example B9. A method comprising: receiving, by a network controller executing in a software defined network (SDN), an advertisement, wherein the advertisement conforms to a routing protocol and comprises information identifying a network service executing in a second network cluster, wherein the network service exposes a backend of a network application to the container orchestration platform of the SDN; generating, by the network controller, a network service directory in a first network cluster based on the advertisement; adding, by the network controller, one or more virtual execution elements executing on the first network cluster as endpoints of the network service, wherein the endpoints run the network application; and implementing a network policy to forward, by one or more virtual routers executing in the SDN, network traffic between endpoints of the network service.

Example B10. The method of example B9, further comprising: generating, by the network controller, the advertisement in the second network cluster; and broadcasting, by the network controller and to the first network cluster executing within the container orchestration platform of the SDN, the advertisement in accordance with the routing protocol.

Example B11. The method of any combination of examples B9 through B10, wherein to add the one or more virtual execution elements executing on the first network cluster as endpoints of the network service, the network controller is further configured to: assign, with a configuration node executing in the first network cluster, the one or more virtual execution elements one or more respective internet protocol (IP) addresses based on the network service directory; and store the IP addresses in the one or more virtual routers.

Example B12. The method of any combination of examples B9 through B11, wherein the network controller is further configured to implement a network traffic load balancing network policy to forward network traffic between endpoints of the network service.

Example B13. The method of any combination of examples B9 through B12, wherein the one or more virtual routers comprise a first virtual router executing in the first network cluster and a second virtual router executing in the second network cluster, and wherein the network controller is further configured to: link a first routing table of the first virtual router a second routing table of the second virtual router to enable communication between endpoints of the network service; and implement a load balancer to regulate network traffic between endpoints of the network service.

Example B14. The method of any combination of examples B9 through B13, wherein the routing protocol includes a multi-protocol border gateway protocol (MP-BGP).

Example B15. The method of any combination of examples B9 through B14, wherein the network controller is configured to generate the advertisement to include a tuple of a fully-qualified domain name (FQDN) of the network service, a protocol used by the network service, and a port used by the network service.

Example B16. The method of any combination of examples B9 through B15, wherein the network controller is further configured to receive the advertisement with a BGP controller executing in the first network cluster.

Example B17. A computer-readable storage medium comprising instructions that, when executed, are configured to cause processing circuitry of a network system to: generate, by a network controller executing in a software defined network (SDN), a network service directory in a first network cluster based on an advertisement, wherein the advertisement conforms to a routing protocol and comprises information identifying a network service executing in a second network cluster, wherein the network service exposes a backend of a network application to the container orchestration platform of the SDN; add, by the network controller, one or more virtual execution elements executing on the first network cluster as endpoints of the network service, wherein the endpoints run the network application; and implement a network policy to forward, by one or more virtual routers executing in the SDN, network traffic between endpoints of the network service.

Example B18. The computer-readable storage medium of example B17, wherein the instructions are further configured to cause the processing circuitry of the network system to: generate, by the network controller, the advertisement in the second network cluster; and broadcast, by the network controller and to the first network cluster executing within the container orchestration platform of the SDN, the advertisement in accordance with the routing protocol.

Example B19. The computer-readable storage medium of any combination of examples B16 through B17, wherein the routing protocol includes a multi-protocol border gateway protocol (MP-BGP).

Example B20. The computer-readable storage medium of any combination of examples B16 through B18, wherein the advertisement includes a tuple of a fully-qualified domain name (FQDN) of the network service, a protocol used by the network service, and a port used by the network service.

Example C1. A computing device comprising processing circuitry having access to a storage device, the processing circuitry configured to: generate an advertisement in a first network cluster executing within a container orchestration platform of a software defined network (SDN), wherein the advertisement conforms to a routing protocol and comprises information identifying a network service executing in the first network cluster, wherein the network service exposes a backend of a network application to the container orchestration platform of the SDN; transmit, to a second network cluster executing within the container orchestration platform of the SDN, the advertisement in accordance with the routing protocol; generate, based on the advertisement, a network service directory in the second network cluster; and add one or more virtual execution elements executing on the second network cluster as endpoints of the network service, wherein the endpoints run the network application.

Example C2. The computing device of example C2, wherein the processing circuitry is further configured to: implement a network policy to forward, by one or more virtual routers executing in the SDN, network traffic between endpoints of the network service.

Example C3. The computing device of any combination of examples C1 through C2, wherein the processing circuitry is further configured to implement a network traffic load balancing network policy to forward network traffic between endpoints of the network service.

Example C4. The computing device of any combination of examples C1 through C3, wherein the one or more virtual routers comprise a first virtual router executing in the first network cluster and a second virtual router executing in the second network cluster, and wherein the processing circuitry is further configured to: link a first routing table of the first virtual router a second routing table of the second virtual router to enable communication between endpoints of the network service; and implement a load balancer to regulate network traffic between endpoints of the network service.

Example C5. The computing device of any combination of examples C1 through C4, wherein the routing protocol includes a multi-protocol border gateway protocol (MP-BGP).

Example C6. The computing device of any combination of examples C1 through C5, wherein the processing circuitry is further configured to generate the advertisement to include a tuple of a fully-qualified domain name (FQDN) of the network service, a protocol used by the network service, and a port used by the network service.

Example C7. The computing device of any combination of examples C1 through C6, wherein the processing circuitry is configured to add the one or more virtual execution elements executing on the second network cluster as endpoints of the network service with a mapping controller.

Example C8. The computing device of any combination of examples C1 through C7, wherein to add the one or more virtual execution elements executing on the second network cluster as endpoints of the network service, the processing circuitry is further configured to: assign the one or more virtual execution elements one or more respective internet protocol (IP) addresses based on the network service directory; and store the IP addresses in the one or more virtual routers.

Example C9. The computing device of any combination of examples C1 through C8, wherein the advertisement comprises a tag identifying a community attribute associated with the network service and applied to members of the community, wherein the members of the community comprise the first network cluster and the second network cluster.

Example C10. A method comprising: generating an advertisement in a first network cluster executing within a container orchestration platform of a software defined network (SDN), wherein the advertisement conforms to a routing protocol and comprises information identifying a network service executing in the first network cluster, wherein the network service exposes a backend of a network application to the container orchestration platform of the SDN; transmitting, to a second network cluster executing within the container orchestration platform of the SDN, the advertisement in accordance with the routing protocol; generating, based on the advertisement, a network service directory in the second network cluster; and adding one or more virtual execution elements executing on the second network cluster as endpoints of the network service, wherein the endpoints run the network application.

Example C11. The method of example C10, further comprising: implementing a network policy to forward, by one or more virtual routers executing in the SDN, network traffic between endpoints of the network service.

Example C12. The method of any combination of examples C10 through C11, further comprising: implementing a network traffic load balancing network policy to forward network traffic between endpoints of the network service.

Example C13. The method of any combination of examples C10 through C12, wherein the one or more virtual routers comprise a first virtual router executing in the first network cluster and a second virtual router executing in the second network cluster, and wherein the method further comprises: linking a first routing table of the first virtual router a second routing table of the second virtual router to enable communication between endpoints of the network service; and implementing a load balancer to regulate network traffic between endpoints of the network service.

Example C14. The method of any combination of examples C10 through C13, wherein the routing protocol includes a multi-protocol border gateway protocol (MP-BGP).

Example C15. The method of any combination of examples C10 through C14, wherein the advertisement includes a tuple of a fully-qualified domain name (FQDN) of the network service, a protocol used by the network service, and a port used by the network service.

Example C16. The method of any combination of examples C10 through C15, further comprising: adding the one or more virtual execution elements executing on the second network cluster as endpoints of the network service with a mapping controller.

Example C17. The method of any combination of examples C10 through C16, further comprising: assigning the one or more virtual execution elements one or more respective internet protocol (IP) addresses based on the network service directory; and storing the IP addresses in the one or more virtual routers.

Example C18. The method of any combination of examples C10 through C17, wherein the advertisement comprises a tag identifying a community attribute associated with the network service and applied to members of the community, wherein the members of the community comprise the first network cluster and the second network cluster.

Example C19. The method of any combination of examples C10 through C18, further comprising: generating and transmitting the advertisement with a first BGP controller executing in the first network cluster; and receiving the advertisement with a second BGP controller executing in the second network cluster.

Example C20. A computer-readable storage medium comprising instructions that, when executed, are configured to cause processing circuitry of a network system to: generate an advertisement in a first network cluster executing within a container orchestration platform of a software defined network (SDN), wherein the advertisement conforms to a routing protocol and comprises information identifying a network service executing in the first network cluster, wherein the network service exposes a backend of a network application to the container orchestration platform of the SDN; transmit, to a second network cluster executing within the container orchestration platform of the SDN, the advertisement in accordance with the routing protocol; generate, based on the advertisement, a network service directory in the second network cluster; and add one or more virtual execution elements executing on the second network cluster as endpoints of the network service, wherein the endpoints run the network application.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A computing system comprising processing circuitry having access to a storage device, the processing circuitry configured to:
generate, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and
broadcast, by the network controller and to a second network cluster executing within the container orchestration platform of the SDN, the advertisement in accordance with the routing protocol.

2. The system of claim 1, wherein the processing circuitry is further configured to:
generate, by the network controller and based on the advertisement, a network service directory in the second network cluster; and
add, by the network controller and with the network service directory, one or more virtual execution elements executing on the second network cluster as endpoints of the network service, wherein the endpoints run the network application.

3. The system of claim 1, wherein the processing circuitry is further configured to:
implement a network policy to forward, by one or more virtual routers executing in the SDN, network traffic between endpoints of the network service.

4. The system of claim 3, wherein the processing circuitry is further configured to implement a network traffic load balancing network policy to forward network traffic between endpoints of the network service.

5. The system of claim 3, wherein the one or more virtual routers comprise a first virtual router executing in the first network cluster and a second virtual router executing in the second network cluster, and wherein the processing circuitry is further configured to:
link a first routing table of the first virtual router a second routing table of the second virtual router to enable communication between endpoints of the network service; and implement a load balancer to regulate network traffic between endpoints of the network service.

6. The system of claim 1, wherein the routing protocol includes a multi-protocol border gateway protocol (MP-BGP).

7. The system of claim 1, wherein the processing circuitry is further configured to generate the advertisement to include a tuple of a fully-qualified domain name (FQDN) of the network service, a protocol used by the network service, and a port used by the network service.

8. The system of claim 1, wherein the processing circuitry is further configured to generate the advertisement and transmit the advertisement with a BGP controller executing in the first network cluster.

9. A method comprising:
generating, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and
broadcasting, by the network controller and to a second network cluster executing within the container orchestration platform of the SDN, the advertisement in accordance with the routing protocol.

10. The method of claim 9 further comprising:
generating, by the network controller and based on the advertisement, a network service directory in the second network cluster;
adding, by the network controller and with the network service directory, one or more virtual execution elements executing on the second network cluster as endpoints of the network service, wherein the endpoints run the network application; and
implementing, by the network controller, a network policy to forward, by one or more virtual routers executing in the SDN, network traffic between endpoints of the network service.

11. The method of claim 10, wherein to add the one or more virtual execution elements executing on the second network cluster as endpoints of the network service, the network controller is further configured to:
assign, with a configuration node executing in the second network cluster, the one or more virtual execution elements one or more respective internet protocol (IP) addresses based on the network service directory; and
store the IP addresses in the one or more virtual routers.

12. The method of claim 10, wherein the network controller is further configured to implement a network traffic load balancing network policy to forward network traffic between endpoints of the network service.

13. The method of claim 10, wherein the one or more virtual routers comprise a first virtual router executing in the first network cluster and a second virtual router executing in the second network cluster, and wherein the network controller is further configured to:
link a first routing table of the first virtual router a second routing table of the second virtual router to enable communication between endpoints of the network service; and implement a load balancer to regulate network traffic between endpoints of the network service.

14. The method of claim 9, wherein the routing protocol includes a multi-protocol border gateway protocol (MP-BGP).

15. The method of claim 9, wherein the network controller is configured to generate the advertisement to include a tuple of a fully-qualified domain name (FQDN) of the network service, a protocol used by the network service, and a port used by the network service.

16. The method of claim 9, wherein the network controller is further configured to generate the advertisement and transmit the advertisement with a BGP controller executing in the first network cluster.

17. A non-transitory computer-readable storage medium comprising instructions that, when executed, are configured to cause processing circuitry of a network system to:
generate, by a network controller executing in a software defined network (SDN), an advertisement in a first network cluster executing within a container orchestration platform of the SDN, wherein the advertisement conforms to a routing protocol and comprises information identifying a network service executing in the first network cluster, wherein the network service exposes a backend of a network application to the container orchestration platform of the SDN; and broadcast, by the network controller and to a second network cluster executing within the container orchestration platform of the SDN, the advertisement in accordance with the routing protocol.

18. The non-transitory computer-readable storage medium of claim 17, wherein the instructions are further configured to cause the processing circuitry of the network system to:

generate, by the network controller and based on the advertisement, a network service directory in the second network cluster; and add, by the network controller and with the network service directory, one or more virtual execution elements executing on the second network cluster as endpoints of the network service, wherein the endpoints run the network application.

19. The non-transitory computer-readable storage medium of claim 17, wherein the routing protocol includes a multi-protocol border gateway protocol (MP-BGP).

20. The non-transitory computer-readable storage medium of claim 17, wherein the advertisement includes a tuple of a fully-qualified domain name (FQDN) of the network service, a protocol used by the network service, and a port used by the network service.

* * * * *